(12) United States Patent
Zhang et al.

(10) Patent No.: US 11,395,168 B2
(45) Date of Patent: Jul. 19, 2022

(54) DYNAMIC MULTI-BEAM TRANSMISSION FOR NEW RADIO TECHNOLOGY MULTIPLE-INPUT MULTIPLE-OUTPUT COMMUNICATIONS

(71) Applicant: QUALCOMM INCORPORATED, San Diego, CA (US)

(72) Inventors: Yu Zhang, Beijing (CN); Chao Wei, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/324,766

(22) PCT Filed: Mar. 1, 2017

(86) PCT No.: PCT/CN2017/075320
§ 371 (c)(1),
(2) Date: Feb. 11, 2019

(87) PCT Pub. No.: WO2018/028182
PCT Pub. Date: Feb. 15, 2018

(65) Prior Publication Data
US 2019/0182697 A1    Jun. 13, 2019

(30) Foreign Application Priority Data

Aug. 12, 2016  (WO) ................ PCT/CN2016/094886

(51) Int. Cl.
*H04W 24/10*       (2009.01)
*H04L 5/00*        (2006.01)
(Continued)

(52) U.S. Cl.
CPC .......... *H04W 24/10* (2013.01); *H04B 7/0456* (2013.01); *H04L 5/005* (2013.01); *H04L 5/0023* (2013.01); *H04W 16/28* (2013.01)

(58) Field of Classification Search
CPC .... H04B 7/088; H04B 7/0695; H04B 7/0456; H04B 7/0617; H04B 7/0473;
(Continued)

(56) References Cited

U.S. PATENT DOCUMENTS

2010/0255790 A1* 10/2010 Farajidana ............ H04B 17/26
                                                                   455/69
2013/0003788 A1*  1/2013 Marinier ............. H04B 7/0626
                                                                  375/219
(Continued)

FOREIGN PATENT DOCUMENTS

CN    102271031 A    12/2011
CN    102291213 A    12/2011
(Continued)

OTHER PUBLICATIONS

International Search Report and Written Opinion for PCT/CN2016/075320, dated May 24, 2017.
(Continued)

*Primary Examiner* — Oussama Roudani
(74) *Attorney, Agent, or Firm* — Patterson & Sheridan, L.L.P

(57) ABSTRACT

Certain aspects of the present disclosure provide techniques for dynamic multi-beam transmission for new radio eNB UE (NR) technology multiple-input multiple-output (MIMO) communications. A user equipment (UE) may measure beamformed channel state information reference signals (CSI-RSs) from one or more transmit and receive points
(Continued)

(TRPs) and report rank information and/or channel quality information for beams associated with the various beamformed CSI-RSs.

27 Claims, 32 Drawing Sheets

(51) Int. Cl.
  *H04B 7/0456* (2017.01)
  *H04W 16/28* (2009.01)
(58) Field of Classification Search
  CPC .... H04B 7/0482; H04W 24/10; H04W 16/28; H04W 72/042; H04L 5/005; H04L 5/0023; H04L 27/2627; H04L 5/0053; H04L 5/0051
  See application file for complete search history.

(56) References Cited

U.S. PATENT DOCUMENTS

| | | | |
|---|---|---|---|
| 2013/0286866 A1* | 10/2013 | Hammarwall | H04L 5/0057 370/252 |
| 2013/0343216 A1 | 12/2013 | Su et al. | |
| 2014/0119228 A1 | 5/2014 | Wang et al. | |
| 2014/0126408 A1 | 5/2014 | Ding et al. | |
| 2014/0211873 A1 | 7/2014 | Park et al. | |
| 2015/0249998 A1* | 9/2015 | Long | H04W 72/1284 370/329 |
| 2015/0358061 A1* | 12/2015 | Zhang | H04B 7/0482 370/329 |
| 2016/0013900 A1 | 1/2016 | Lee et al. | |
| 2016/0173182 A1 | 6/2016 | Jongren | |
| 2016/0337056 A1* | 11/2016 | Frenne | H04B 7/0695 |
| 2017/0078065 A1* | 3/2017 | Nam | H04L 5/005 |
| 2019/0052331 A1* | 2/2019 | Chang | H04B 7/0626 |

FOREIGN PATENT DOCUMENTS

| | | |
|---|---|---|
| CN | 102595469 A | 7/2012 |
| CN | 103220068 A | 7/2013 |
| CN | 103918208 A | 7/2014 |
| CN | 103959839 A | 7/2014 |
| CN | 104735691 A | 6/2015 |
| EP | 2642709 A2 | 9/2013 |

OTHER PUBLICATIONS

International Search Report and Written Opinion—PCT/CN2016/094886—ISA/EPO—dated Apr. 28, 2017.
Supplementary European Search Report—EP17838318 Search Authority—The Hague—dated Jul. 1, 2020.
Supplementary Partial European Search Report—EP17838318—Search Authority—The Hague—dated Mar. 4, 2020.
Li H., et al., "CSI-RS Based CQI Measurement," Guangdong Communication Technology, 7 Pages, Dec. 20, 2016.

* cited by examiner

DYNAMIC MULTI-BEAM TRANSMISSION FOR NEW RADIO TECHNOLOGY MULTIPLE-INPUT MULTIPLE-OUTPUT COMMUNICATIONS

This application claims priority to International Application No. PCT/CN2016/094886 filed Aug. 12, 2016, which is assigned to the assignee of the present application and is expressly incorporated by reference herein in its entirety.

INTRODUCTION

Aspects of the present disclosure relate generally to wireless communications systems, and more particularly, to dynamic multi-beam transmission for new radio (NR) technology multiple-input multiple-output (MIMO) communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of NodeBs that can support communication for a number of user equipments (UEs). A UE may communicate with a NodeB via the downlink and uplink. The downlink (or forward link) refers to the communication link from the NodeB to the UE, and the uplink (or reverse link) refers to the communication link from the UE to the NodeB.

These multiple access technologies have been adopted in various telecommunication standards to provide a common protocol that enables different wireless devices to communicate on a municipal, national, regional, and even global level. An example of an emerging telecommunication standard is new radio (NR. e.g., $5^{th}$ Generation (5G) radio access). NR is a set of enhancements to the LTE mobile standard promulgated by Third Generation Partnership Project (3GPP). It is designed to better support mobile broadband Internet access by improving spectral efficiency, lower costs, improve services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for dynamic multi-beam transmissions for new radio (NR) technology multiple-input multiple-output are described herein.

In an aspect, a method for wireless communications is provided. The method may be performed, for example, by a wireless node. The method generally includes receiving a plurality of channel state information reference signals (CSI-RSs) wherein a plurality CSI-RS resources each correspond to a set of the CSI-RSs and a set of antenna ports used in transmitting the corresponding CSI-RSs, assuming a plurality of first transmissions on a plurality of time-frequency resource units, each first transmission comprising a plurality of layers and using a plurality of the antenna ports associated with one of the plurality of CSI-RS resources, wherein different subsets of the antenna ports may be used for different time-frequency resource units in one transmission, determining a common rank for the assumed plurality of first transmissions and a plurality of first channel quality metrics, wherein each first channel quality metric is based on a corresponding first transmission, and transmitting a rank indicator (RI) indicating the determined common rank and a plurality of first channel quality indicators (CQIs), each first CQI indicating one of the plurality first channel quality metrics.

In an aspect, a method for wireless communications is provided. The method may be performed, for example, by a wireless node. The method generally includes receiving a plurality of channel state information reference signals (CSI-RSs), wherein a plurality of CSI-RS resource each correspond to a set of the CSI-RSs and a set of antenna ports used in transmitting the corresponding set of CSI-RSs, determining, based on a plurality of channel quality metrics corresponding to the plurality of CSI-RS resources, a subset of the CSI-RS resources assuming a transmission on a plurality of time-frequency resource units using the antenna ports corresponding to the determined CSI-RS resources, wherein two different subsets of the antenna ports may be used for two different time-frequency resource units in the assumed transmission, determining a rank for the assumed transmission and a channel quality metric based on the assumed transmission using the determined rank, and transmitting a plurality of CSI resource indicators (CRIs) indicating the determined CSI-RS resources, a rank indicator (RI) indicating the determined rank, and a channel quality indicator (CQI) indicating the channel quality metric corresponding to the assumed transmission.

In an aspect, a method for wireless communications is provided. The method may be performed, for example, by a wireless node. The method generally includes receiving a plurality of channel state information reference signals (CSI-RSs), wherein a plurality CSI-RS resources each correspond to a set of the cell-specific CSI-RSs, receiving a set of UE-specific CSI-RSs, wherein a UE-specific CSI-RS resource corresponds to the UE-specific CSI-RSs, determining a plurality of best CSI-RS resources assuming a first transmission on a plurality of time-frequency resource units using antenna ports associated with the determined cell-specific CSI-RS resources, determining a rank based on the assumed first transmission, determining a channel quality metric assuming a second transmission using the antenna ports associated with the determined CSI-RS resources and using the determined rank, and transmitting a plurality of CSI resource indicators (CRIs) indicating the determined CSI-RS resources, a rank indicator (RI) indicating the determined rank, and a channel quality indicator (CQI) indicating the channel quality metric corresponding to the assumed transmission.

In an aspect, a method for wireless communications is provided. The method may be performed, for example, by a wireless node. The method generally includes receiving a plurality of channel state information reference signals (CSI-RSs), wherein a plurality of CSI-RS resources each correspond to a set of the CSI-RSs, determining a first set of the CSI-RS resources based on the plurality of CSI-RSs, assuming a transmission on a plurality of time-frequency resource units using antenna ports associated with the determined first set of CSI-RS resources, determining a plurality of second CSI-RS resources based on the first set of CSI-RS resources, each for a time-frequency resource unit, assuming antenna ports associated with a second CSI-RS resource are used for the assumed transmission on the corresponding time-frequency resource unit, determining a rank for the assumed transmission, determining a channel quality metric based on the assumed transmission using the determined rank, and transmitting a first set of CSI-RS resource indicators (CRIs) indicating the determined first set of CSI-RS resources, a second set of CRIs indicating the determined second CSI-RS resources, each for the corresponding time-frequency resource unit, and a channel quality indicator (CQI) indicating the channel quality metrics.

In an aspect, a method for wireless communications is provided. The method may be performed, for example, by a wireless node. The method generally includes receiving a plurality of channel state information reference signals (CSI-RSs), wherein a plurality of CSI-RS resources each correspond to a set of the CSI-RSs, determining a plurality of best time-frequency resource units and a plurality of CSI-RS resources based on the CSI-RSs, each determined CSI-RS resource corresponding to a determined time-frequency resource unit assuming a transmission on each time-frequency resource unit using antenna ports associated with the corresponding determined CSI-RS resources, determining a rank for the assumed plurality of transmissions and a channel quality metric based on the assumed plurality of transmissions, and transmitting a plurality of pairs of CSI-RS resource indicators (CRIs) and indices of time-frequency resource units, wherein each pair indicates one of the determined best time-frequency resource units and the corresponding CSI-RS resource, a rank indicator (RI) indicating the determined rank, and a channel quality indicator (CQI) indicating the channel quality metric for the transmission.

In an aspect, a method for wireless communications is provided. The method may be performed, for example, by a wireless node. The method generally includes receiving a plurality of beamformed channel state information (CSI) reference signal (CSI-RS) resources and reporting CSI, based on the plurality of beamformed CSI-RS resources.

In an aspect, a method for wireless communications is provided. The method may be performed, for example, by a wireless node. The method generally includes receiving a plurality of beamformed channel state information (CSI) reference signals (CSI-RS)s, wherein a plurality of CSI-RS resources each correspond to a set of the beamformed CSI-RSs, selecting, based on a plurality of channel quality metrics corresponding to the plurality of CSI-RS resources, one or more best CSI-RS resources, reporting a set of CSI-RS resource indicators (CRIs), each CRI indicating one of the best CSI-RS resources, wherein beams associated with the corresponding resources may be considered for dynamic beam switching, and reporting at least one aggregated rank indicator (RI) or channel quality indicator (CQI) based on the CSI-RS resources corresponding to the set of CRIs, wherein an open-loop multiple-input multiple-output (MIMO) transmission is assumed using ports associated with the CSI-RS resources corresponding to the CRIs.

In an aspect, a method for wireless communications is provided. The method may be performed, for example, by a wireless node. The method generally includes receiving a plurality of beamformed channel state information (CSI) reference signals (CSI-RS)s, wherein a plurality of CSI-RS resources each correspond to a set of the beamformed CSI-RSs, reporting CSI, based on the plurality of beamformed CSI-RSs, reporting a set of CSI-RS resource indicators (CRIs), each CRI corresponding to a CSI-RS resource in the plurality of CSI-RS resources, wherein beams associated with the corresponding CSI-RS resources are considered as a set of reference beams, deriving a set of candidate beams for rank indicator (RI) or channel quality indicator (CQI) reporting based on the set of reference beams, and reporting at least one aggregated RI or CQI based on the set of candidate beams, wherein an open loop multiple-input multiple-output (MIMO) transmission is assumed using antenna ports associated with the candidate beams.

In an aspect, a method for wireless communications is provided. The method may be performed, for example, by a wireless node. The method generally includes receiving a plurality of beamformed channel state information (CSI) reference signals (CSI-RS)s, wherein a plurality of CSI-RS resources each correspond to a set of the beamformed CSI-RSs, reporting CSI, based on the plurality of beamformed CSI-RSs, receiving a plurality of cell-specific beamformed CSI-RSs, wherein a plurality of cell-specific CSI-RS resources each correspond to a set of the cell-specific beamformed CSI-RSs. and a first UE-specific beamformed CSI-RS, reporting, in a subframe, a set of CSI-RS resource indicators (CRIs), each CRI corresponding to a cell-specific CSI-RS resource, wherein beams associated with the corresponding cell-specific beamformed CSI-RSs are considered as a set of reference beams, reporting, in the subframe, a rank indicator (RI) based on the reference beams, receiving one or more second UE-specific CSI-RSs in one or more other subframes, wherein the second UE-specific CSI-RSs are transmitted using at least one beamformer that is different from beamformers used to transmit the cell-specific CSI-RSs and is derived from the reference beams, and reporting a channel quality indicator (CQI) based on the first and the second UE-specific CSI-RSs.

In an aspect, a method for wireless communications is provided. The method may be performed, for example, by a wireless node. The method generally includes receiving a plurality of beamformed channel state information (CSI) reference signals (CSI-RSs), wherein a plurality of CSI-RS resources each correspond to a set of the beamformed CSI-RSs, reporting CSI, based on the plurality of beamformed CSI-RSs. and reporting one or more first level wideband CSI-RS resource indicators (CRIs), wherein beams associated with each of the sets of CSI-RS resources are considered for dynamic beam switching.

In an aspect, a method for wireless communications is provided. The method may be performed, for example, by a wireless node. The method generally includes receiving a plurality of beamformed channel state information (CSI) reference signals (CSI-RS)s, wherein a plurality of CSI-RS resources each correspond to a set of the beamformed CSI-RSs, reporting CSI, based on the plurality of beamformed CSI-RSs, reporting one or more first level wideband CSI-RS resource indicators (CRIs), each corresponding to a set of CSI-RS resources, wherein beams associated with each of the sets of CSI-RS resources are considered for dynamic beam switching, and reporting at least one best CRI.

In an aspect, a method for wireless communications is provided. The method may be performed, for example, by a wireless node. The method generally includes receiving a plurality of beamformed channel state information (CSI) reference signals (CSI-RS)s, wherein a plurality of CSI-RS resources each correspond to a set of the beamformed CSI-RSs, reporting CSI, based on the plurality of beamformed CSI-RSs, reporting a first level wideband CSI-RS resource indicator (CRI), corresponding to a set of the CSI-RS resources, wherein beams associated with each of the sets of resources are considered for dynamic beam switching, and reporting an aggregated rank indicator (RI) or channel quality indicator (CQI) based on the CSI-RS resources corresponding to the one or more CRIs, wherein an open-loop multiple-input multiple-output (OL-MIMO) transmission is assumed.

In an aspect, a method for wireless communications is provided. The method may be performed, for example, by a wireless node. The method generally includes obtaining a configuration indicating a plurality of beamformed channel state information (CSI) reference signal (CSI-RS) resources, wherein each CRI-RS resource corresponds to a set of beamformed CSI-RSs and is associated with either an open-loop multiple-input multiple-output (MIMO) transmission scheme or a closed-loop MIMO transmission scheme, determining a CSI for each of the plurality of beamformed CSI-RS resources, wherein each CSI is determined based on the transmission scheme associated with the corresponding CSI-RS resource; and reporting at least one of the CSIs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
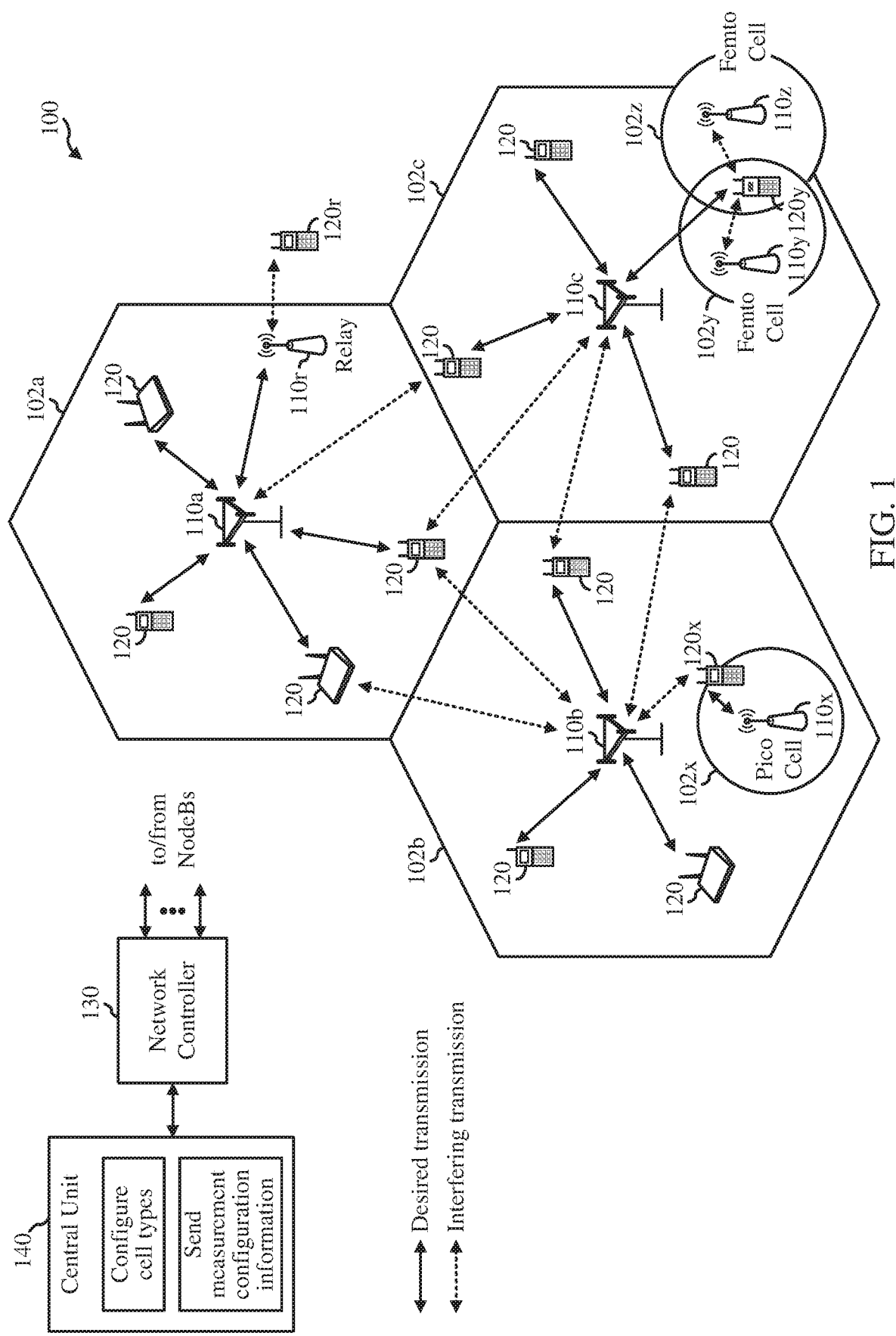
FIG. 1 is a block diagram conceptually illustrating an example telecommunications system, according to aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) techniques targeting wide bandwidth (e.g. 80 MHz beyond) communications, millimeter wave (mmW) techniques targeting high carrier frequency (e.g. 60 GHz) communications, massive machine type communications (mMTC) techniques targeting non-backward compatible MTC techniques, and mission critical techniques targeting ultra reliable low latency communications (URLLC). For these general topics, different techniques are considered, including coding techniques such as low-density parity check (LDPC) coding, and polar coding. An NR cell may refer to a cell operating according to the new air interface or fixed transport layer. An NR NodeB (e.g., a 5G NodeB) may correspond to one or multiple transmission and reception points (TRPs).

NR cells can be configured as access cell (ACells) or data only cells (DCells). For example, a radio access network (RAN) (e.g., a central unit or a distributed unit) can configure the cells as ACells or DCells. DCells may be cells used for carrier aggregation or dual connectivity, but not used for initial access, cell selection/reselection, or handover. In some cases DCells, may not transmit synchronization signals (SS)—in other cases DCells may transmit SS. A TRP of a DCell or an ACell may transmit downlink signals to UEs indicating the cell type of the cell that the TRP serves. Based on the cell type indication, a UE may communicate with the TRP. For example, a UE may determine TRPs to consider for cell selection, access, handover, and/or measurement based on cell types indicated by the TRPs.

In some cases, a UE can receive measurement configuration from the RAN. The measurement configuration information may indicate ACells or DCells for the UE to measure. The UE may monitor and/or detect measurement reference signals from the cells based on measurement configuration information. In some cases, the UE may blindly detect measurement reference signals (MRS). In some cases the UE may detect MRS based on MRS identifiers (MRS-IDs) indicated from the RAN. The UE may report the measurement results to the RAN via one or more TRPs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE. CDMA, TDMA, FDMA. OFDMA. SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA). Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA. E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 1200-2300, discussed in more detail below with reference to FIGS. 12-23, for dynamic multi-beam communications in NR systems. NodeB 110 may comprise a transmission and reception point (TRP) configured to perform operations complementary to operations 1200-2300. The new radio network 100 may comprise a central unit 140 configured to coordinate communications between TRPs, such as coordinated multi-point (CoMP) operations. According to certain aspects, the UEs 120, NodeBs (TRPs) 110, and central unit 140 may be configured to perform operations related to measuring and selecting beams for multiple-input multiple-output communications, which are described in greater detail below.

Each NodeB (TRP) 110 may provide communication coverage for a particular geographic area. In 3GPP (e.g., 4G, 5G, and NR) communications systems, the term "cell" can refer to a coverage area of a NodeB (e.g., a TRP) and/or a NodeB subsystem (e.g., a TRP) serving this coverage area, depending on the context in which the term is used.

A NodeB (e.g. a TRP) may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A NodeB for a macro cell may be referred to as a macro NodeB. A NodeB for a pico cell may be referred to as a pico NodeB. A NodeB for a femto cell may be referred to as a femto NodeB or a home NodeB. In the example shown in FIG. 1, the NodeBs 110a. 110b and 110c may be macro NodeBs for the macro cells 102a. 102b and 102c, respectively. The NodeB 110x may be a pico NodeB for a pico cell 102x. The NodeBs 110y and 110z may be femto NodeBs for the femto cells 102y and 102z, respectively. A NodeB may support one or multiple (e.g., three) cells.

The wireless network 100 may also include relay stations. A relay station is a station that receives a transmission of data and/or other information from an upstream station (e.g., a NodeB or a UE) and sends a transmission of the data and/or other information to a downstream station (e.g., a UE or a NodeB). A relay station may also be a UE that relays transmissions for other UEs. In the example shown in FIG. 1, a relay station 110r may communicate with the NodeB 110a and a UE 120r in order to facilitate communication between the NodeB 110a and the UE 120r. A relay station may also be referred to as a relay NodeB, a relay, etc.

The wireless network 100 may be a heterogeneous network that includes NodeBs of different types, e.g., macro NodeBs, pico NodeBs, femto NodeBs, relays, transmission reception points (TRPs), etc. These different types of NodeBs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the NodeBs may have similar frame timing, and transmissions from different NodeBs may be approximately aligned in time. For asynchronous operation, the NodeBs may have different frame timing, and transmissions from different NodeBs may not be aligned in time. The techniques described herein may be used for both synchronous and asynchronous operation.

A network controller 130 may couple to a set of NodeBs and provide coordination and control for these NodeBs. The network controller 130 may communicate with the NodeBs 110 via a backhaul. The NodeBs 110 may also communicate with one another. e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes and have a length of 10 ms. Consequently, each subframe may have a length of 0.2 ms. Each subframe may indicate a link direction (i.e., DL or UL) for data transmission and the link direction for each subframe may be dynamically switched. Each subframe may include data in the indicated link direction (i.e., DL or UL) as well as both DL and UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based air interface. NR networks may include entities such central units or distributed units.

Figure 2:
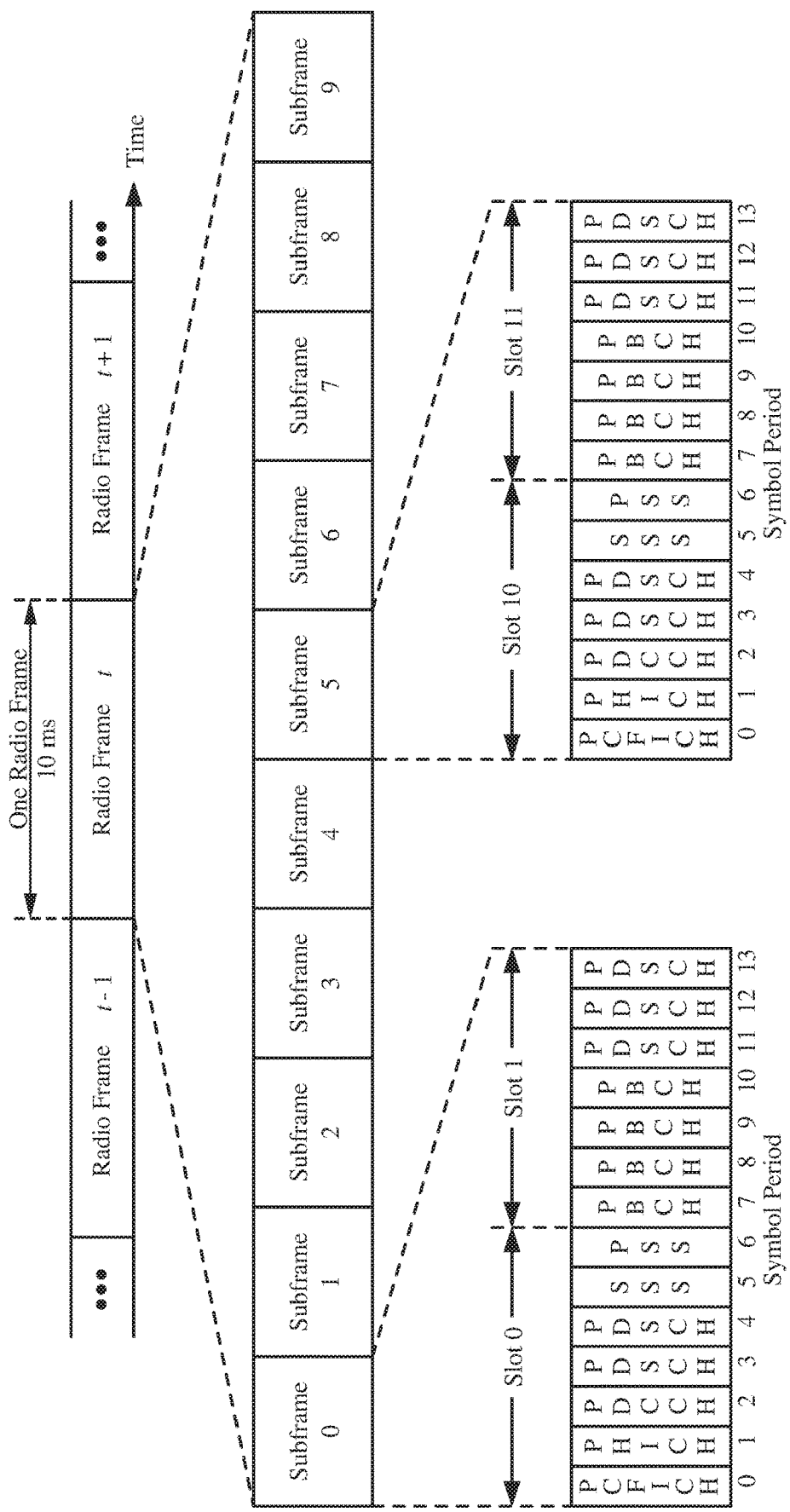
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L–1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell served by the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation." which is publicly available.

The NodeB may send the PSS. SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS. PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
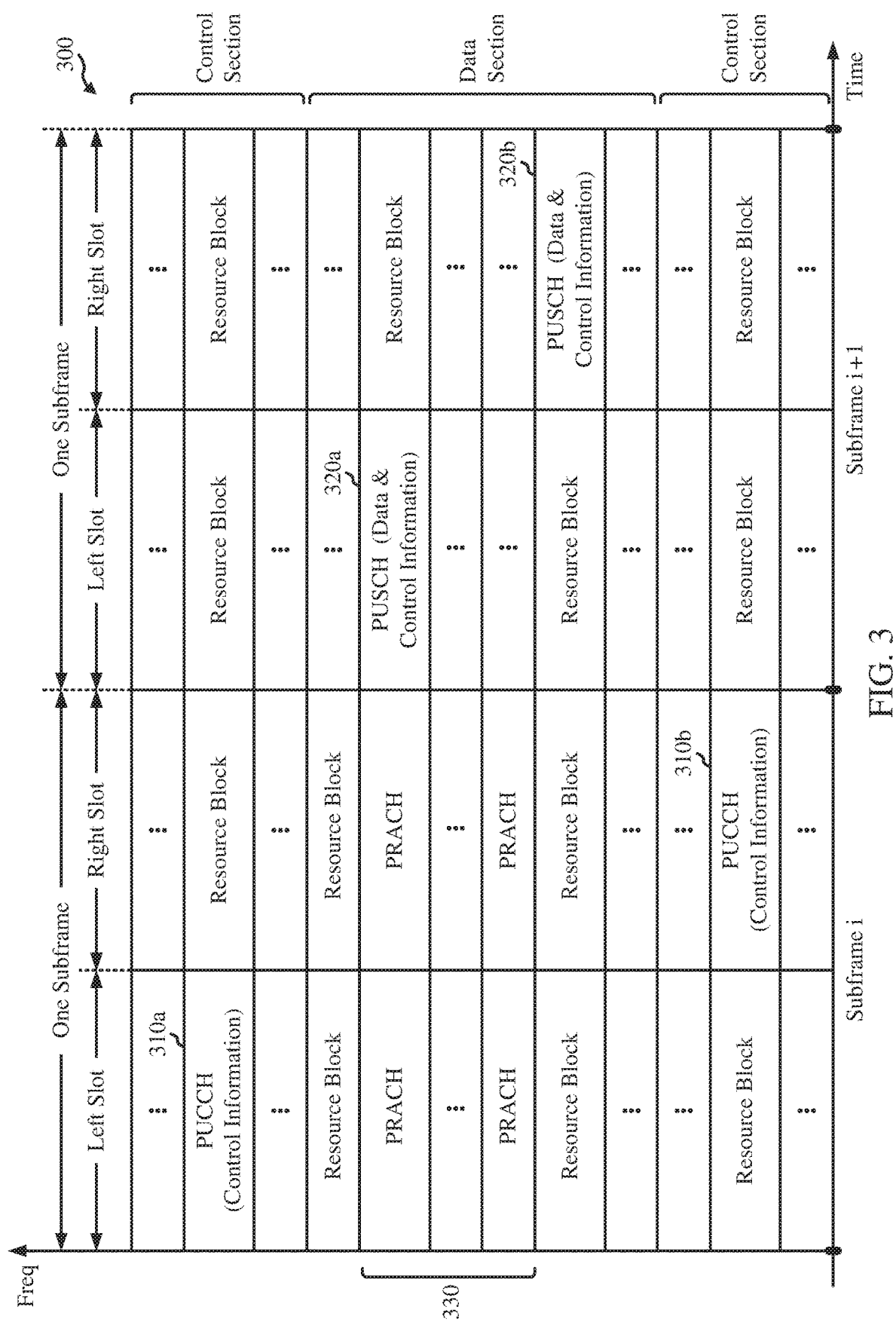
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310$a$, 310$b$ in the control section to transmit control information to a NodeB. The UE may also be assigned resource blocks 320$a$, 320$b$ in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
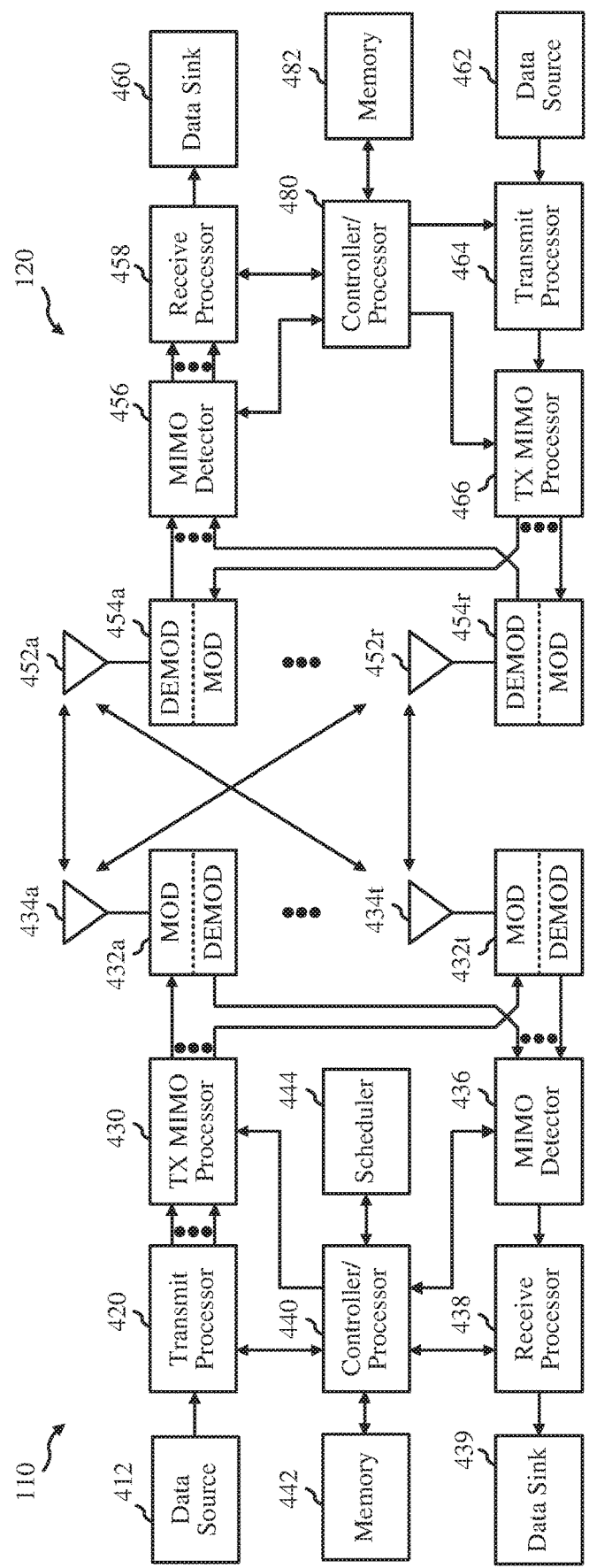
FIG. 4 is a block diagram conceptually illustrating a design of an example NodeB and user equipment (UE), according to aspects of the present disclosure.

FIG. 4 illustrates example components of the NodeB (e.g., TRP) 110 and UE 120 illustrated in FIG. 1, which may be used to implement aspects of the present disclosure. One or more components of the NodeB 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-23.

For a restricted association scenario, the NodeB 110 may be the macro NodeB 110c in FIG. 1, and the UE 120 may be the UE 120y. The NodeB 110 may also be a NodeB of some other type. The NodeB 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH. PCFICH. PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS. SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-23, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
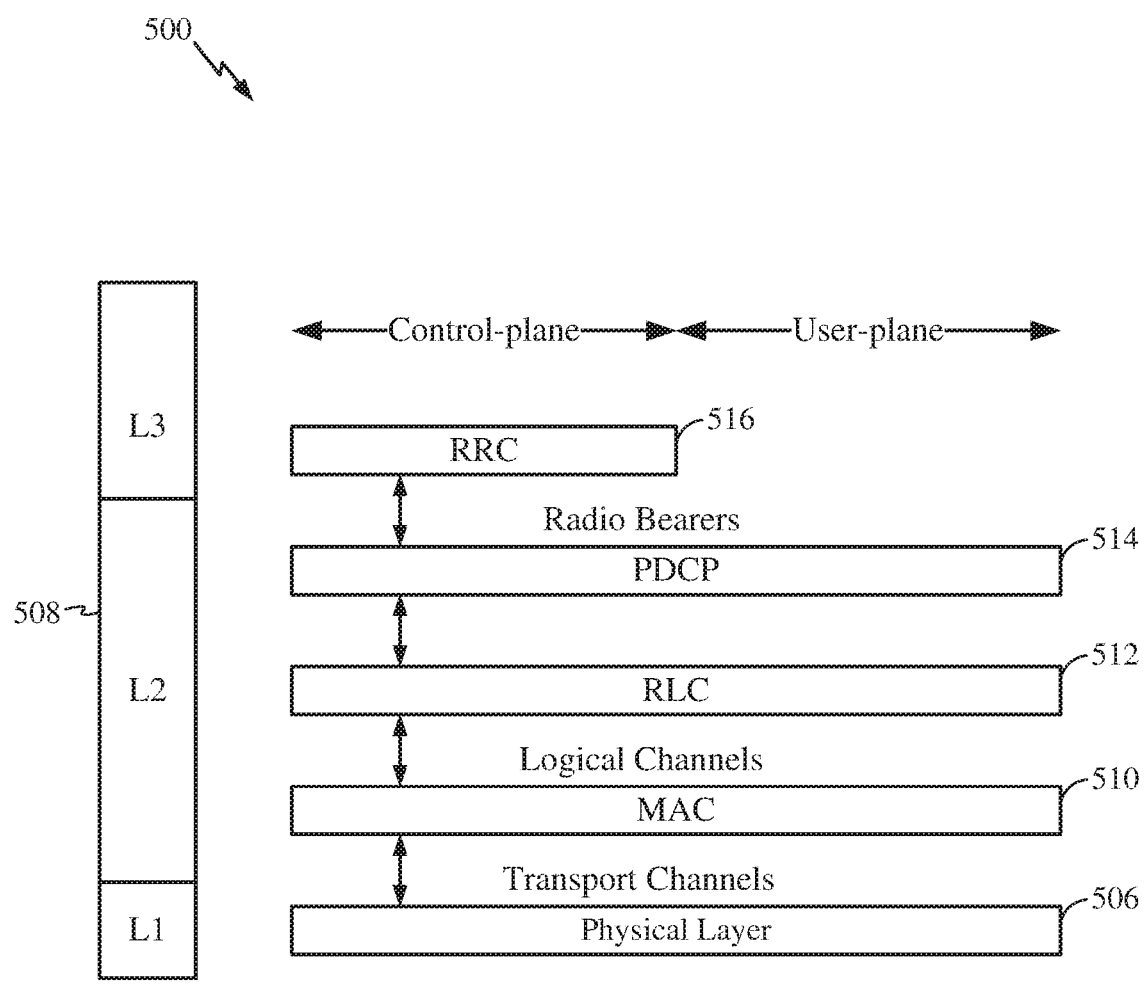
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the NodeB is shown with three layers: Layer 1. Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and NodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the NodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between NodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and NodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the NodeB and the UE.

Figure 6:
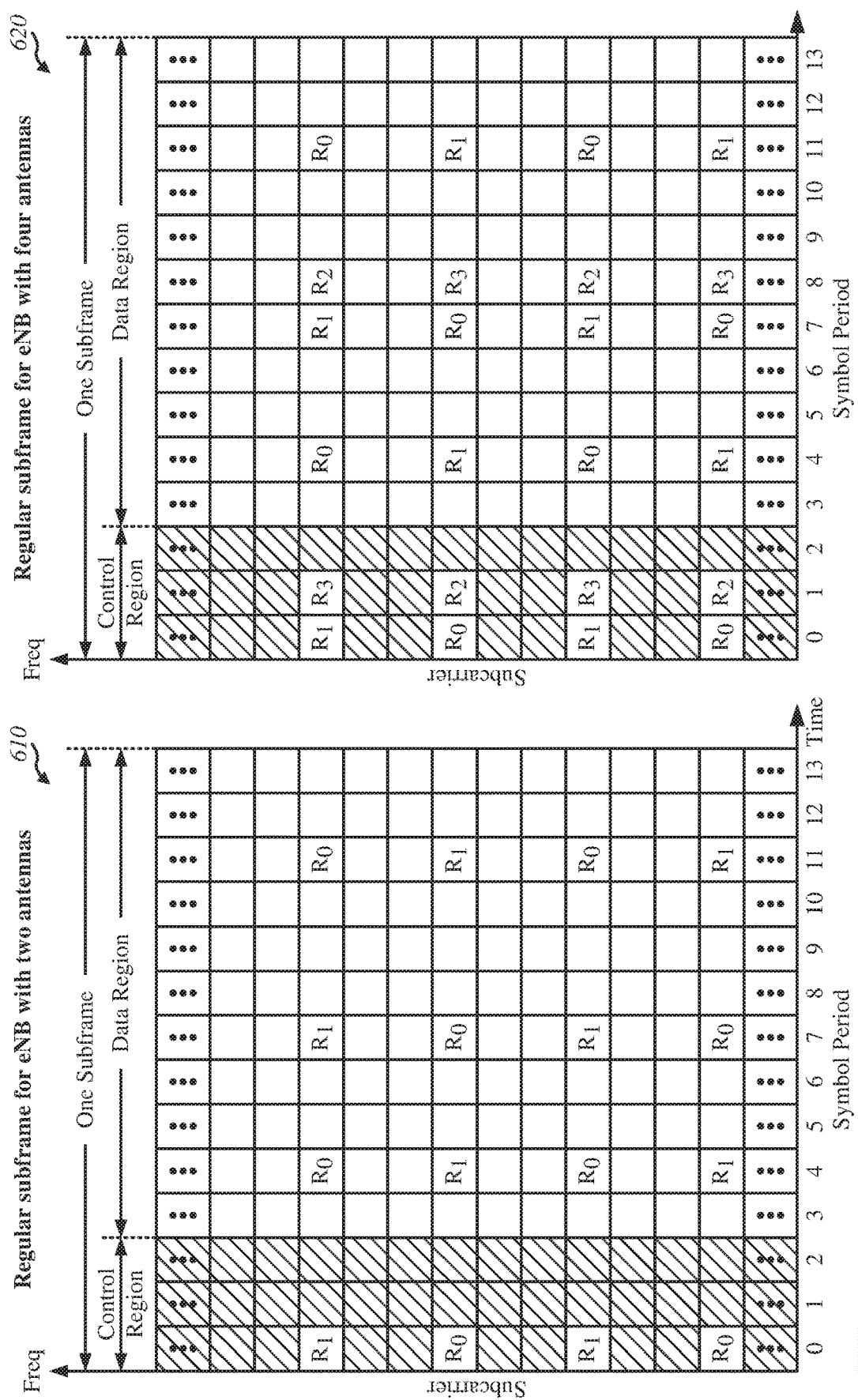
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a NodeB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell. e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a NodeB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different NodeBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., a NodeB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple NodeBs. One of these NodeBs may be selected to serve the UE. The serving NodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering NodeBs.

Example New Radio Cell Measurement

New radio (NR) may refer to radios configured to operate according a wireless standard, such as 5G (e.g., wireless network 100). NR may include Enhanced mobile broadband (eMBB) techniques targeting wide bandwidth (e.g. 80 MHz beyond) communications, millimeter wave (mmW) techniques targeting high carrier frequency (e.g. 60 GHz) communications, massive MTC (mMTC) techniques targeting communications with non-backward compatible MTC devices, and mission critical techniques targeting ultra reliable low latency communications (URLLC).

An NR cell may refer to a cell operating according in an NR network. A NR NodeB (e.g., NodeB 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., central unit 140). The CU may be an Access node controller (ANC). The CU terminates a backhaul interface to the RAN core network (RAN-CN) and terminates backhaul interfaces to neighboring RAN nodes. The RAN may include a distributed unit that may be one or more TRPs that may be connected to one or more ANCs (not shown). TRPs may advertise System Information (e.g., a Global TRP identifier (TRP ID)), may include PDCP, RLC, and/or MAC functions, may comprise one or more antenna ports, and may be configured to individually (dynamic selection) or jointly (joint transmission) serve traffic to a UE.

Example Dynamic Multi-Beam Transmission for New Radio Multiple Input Multiple Output Communications According to aspects of the present disclosure, techniques are provided for dynamic multi-beam transmission and reception in NR multiple-input multiple-output wireless communication systems. The disclosed techniques relate to techniques for UEs to assist in selecting beams and antenna ports for transmissions to the UEs and techniques for reporting channel state information (CSI) based on beams and antenna ports selected for transmissions.

Figure 7A:
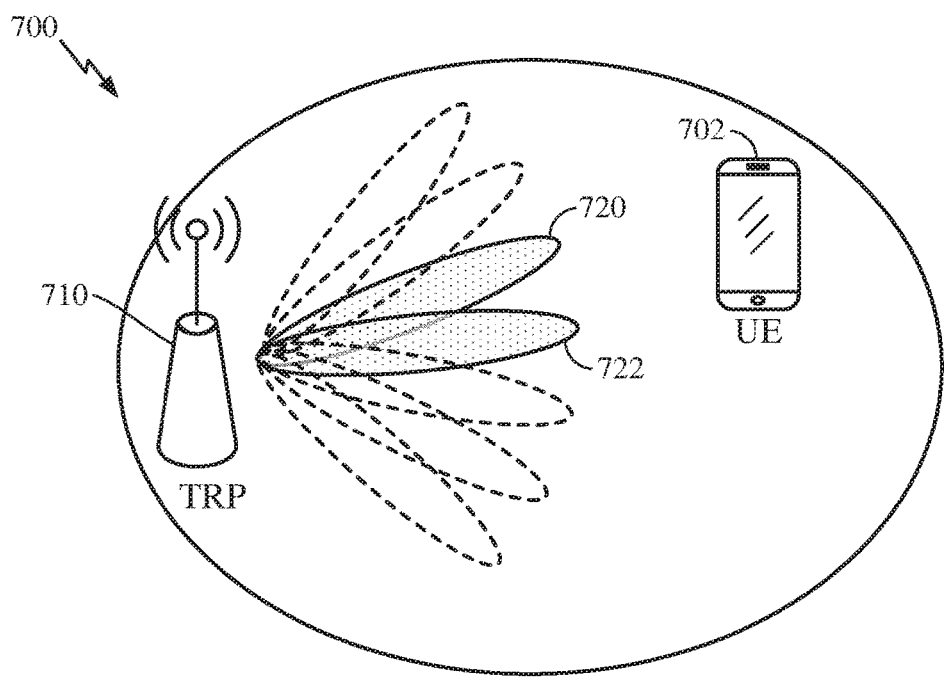
FIGS. 7A and 7B show exemplary wireless communications systems, in accordance with aspects of the present disclosure.
Figure 7B:
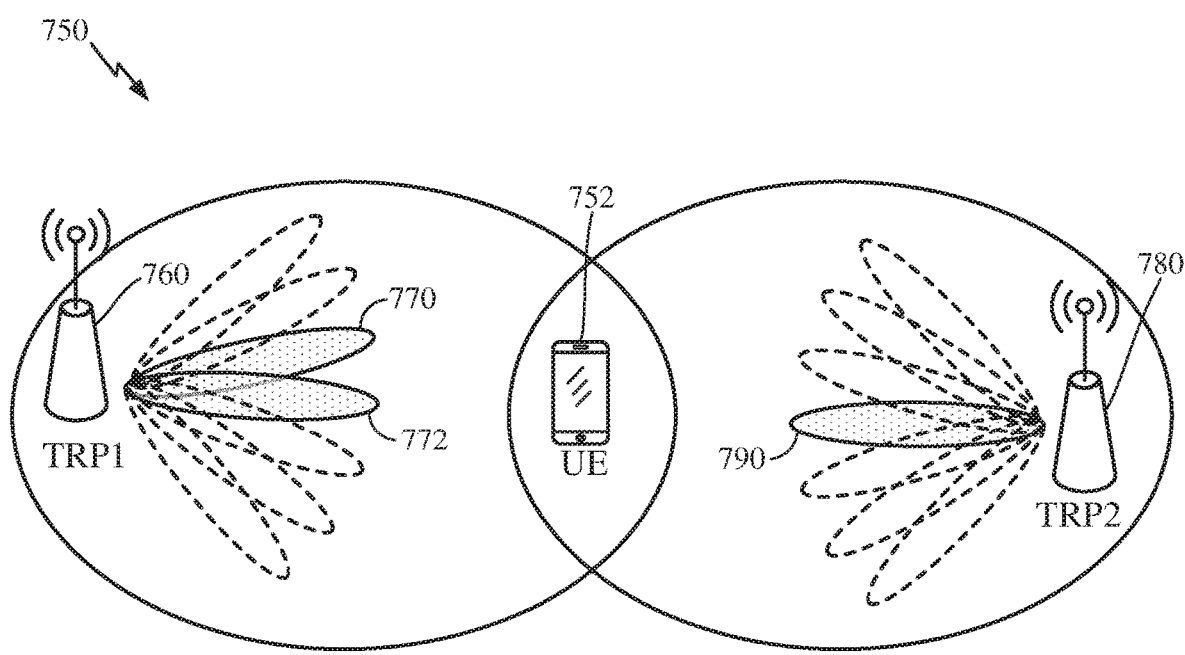

In NR communications systems, a UE may be served by one or more TRPs using single or multiple beams, as depicted in FIGS. 7A and 7B. FIG. 7A shows an exemplary wireless communications system 700 in which a UE 702 is being served by a single TRP 710 using two beams 720, 722. FIG. 7B shows an exemplary wireless communications system 750 in which a UE 752 is being served by a TRP 760 using two beams 770, 772 and another TRP 780 (e.g., using joint transmission) using a single beam 790.

According to aspects of the present disclosure, a beam may be associated with one or more (beamformed) antenna ports, and an antenna port may be associated with a reference signal (RS). As used herein, a RS resource refers to a set of RSs and thus may be associated with a set of antenna ports and with a set of beams.

Figure 8A:
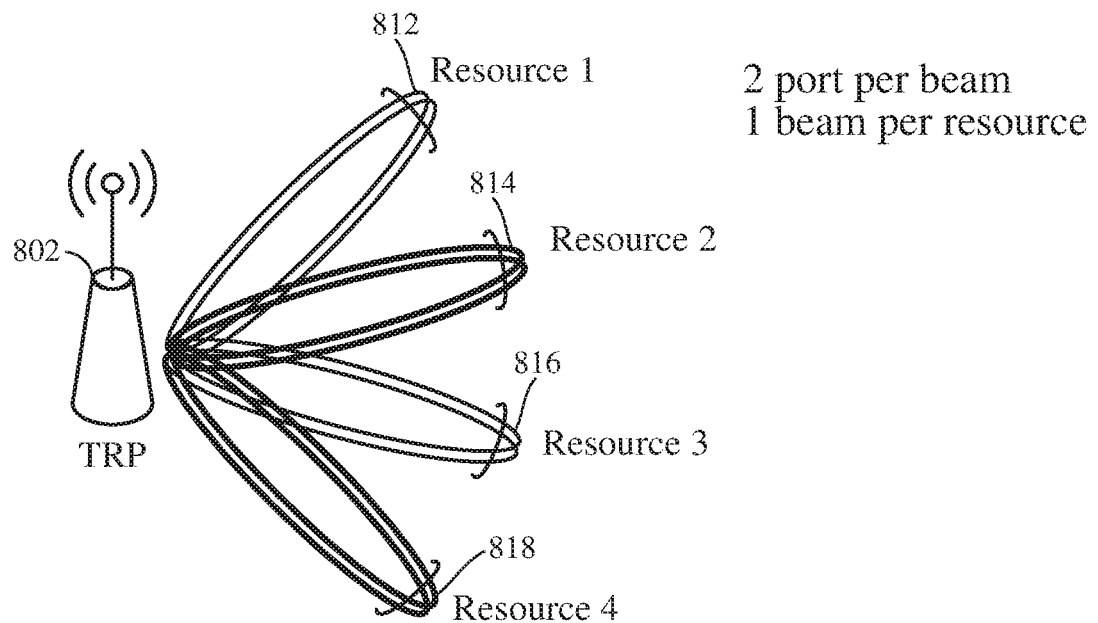
FIGS. 8A and 8B show exemplary associations of beams with reference signal resources and antenna ports, in accordance with aspects of the present disclosure.
Figure 8B:
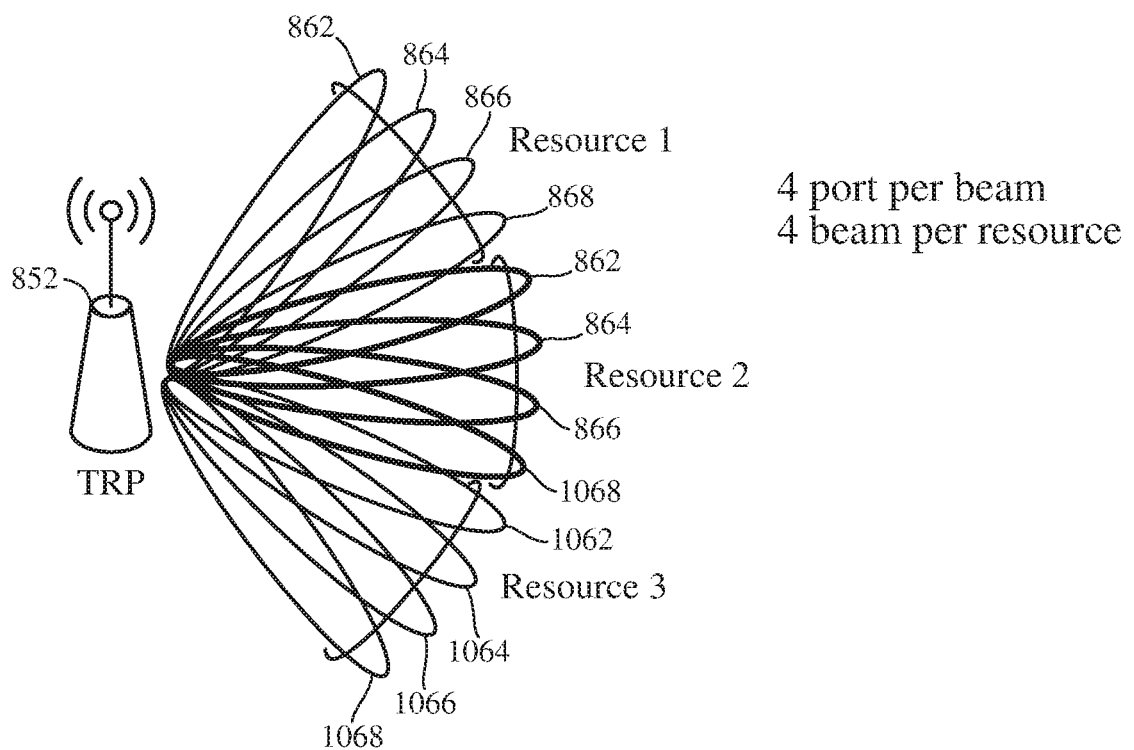

FIGS. 8A and 8B show exemplary associations of beams with reference signal resources and antenna ports. In FIG. 8A, each of four beams 812, 814, 816, 818 transmitted from TRP 1002 is associated with two antenna ports. The four beams are also each associated with one RS resource. In FOG. 8B, each of four beams 862, 864, 866, 868 transmitted from TRP 852 is associated with four antenna ports. The four beams are also each associated with three RS resources.

In NR wireless communication systems, beam based transmissions may be used, wherein one or more layers of data are delivered to a UE using one or more antenna ports from a single or multiple TRPs. A layer(s) to port mapping may or may not be transparent to a UE receiving a transmission. That is, layers of a transmission to the UE may be mapped to antenna ports, and the UE may receive the transmission with or without having information regarding the mapping. By reporting CSI to a serving cell (e.g., to a TRP, to a NodeB), the UE may suggest use of a subset of beams and/or ports out of those associated with configured RS resource(s), the number of layers (e.g., suggested by the reported RI included in the CSI), and the MCS of each layer (e.g., suggested by the reported CQI included in the CSI), assuming a certain preceding (i.e., mapping from layers to the suggested beams/ports). The preceding may be determined according open loop or closed loop MIMO techniques. In the case of closed-loop MIMO (CL-MIMO), the preceding assumption for RI and/or CQI is also indicated by the UE reporting a precoding matrix indicator (PMI), which may also indicate that the UE suggests beam cycling. In the case of open-loop MIMO (OL-MIMO), the preceding assumption may be fully predetermined (e.g., in a network specification). For example, a defined codebook may be used, where the precoders in the codebook are cycled through in a series of transmissions. Additionally or alternatively, the preceding may be partially indicated by UE reporting a PMI and partially predetermined.

Figure 9:
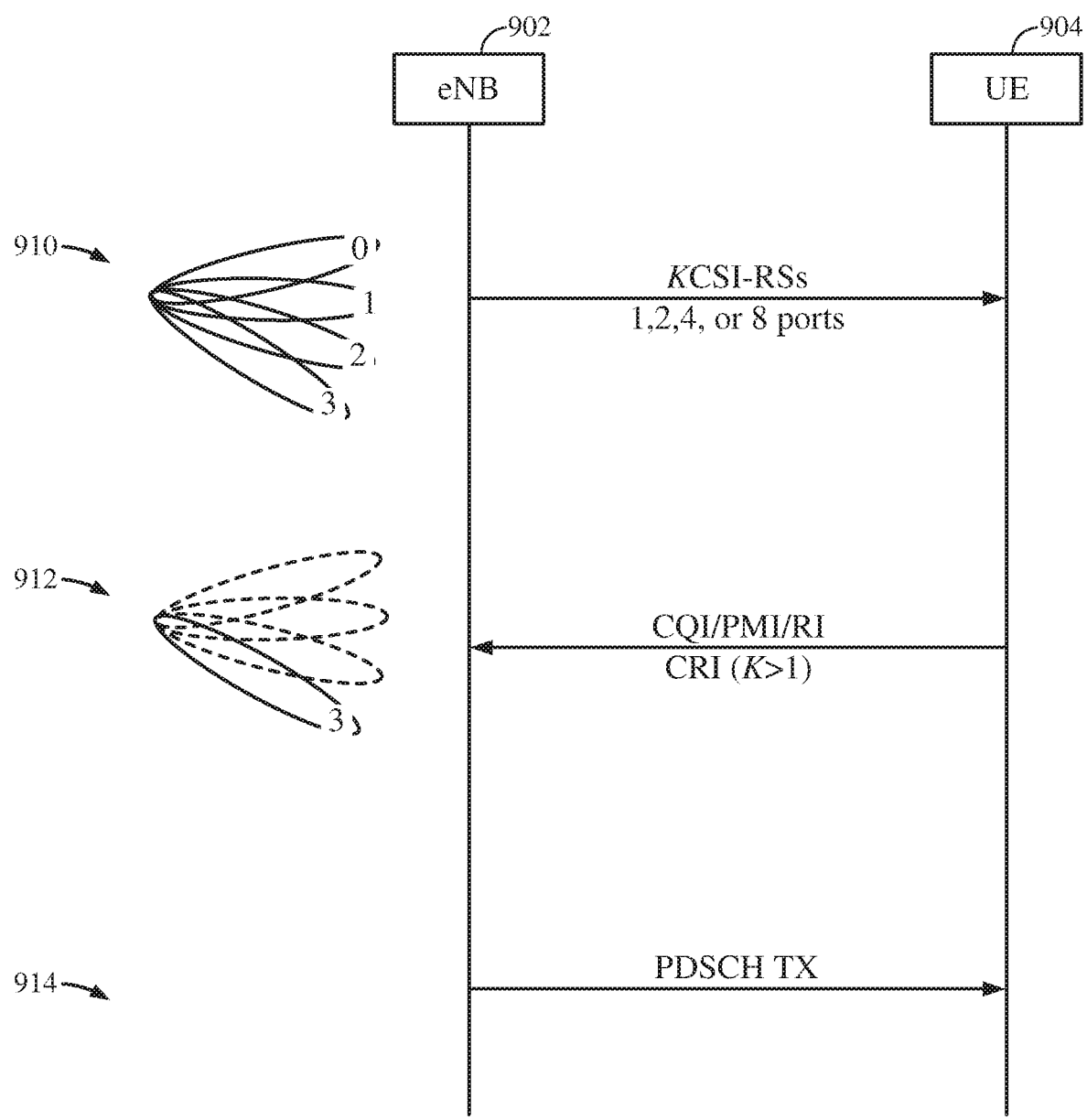
FIG. 9 illustrates an example communications system performing operations to report and receive CSI feedback (CSF) based on multiple BF CSI-RSs, in accordance with aspects of the present disclosure.

Two issues that may be addressed are i) how to have a UE assist a TRP (e.g., a NodeB) in selecting a beam and port, and, once selected, ii) how to have the UE report CSI based on this selection. FIG. 9 illustrates an example communications system 900 performing operations to report and receive CSI feedback (CSF) based on multiple beamformed (BF) CSI-RSs as mentioned above, according to aspects of the present disclosure. The exemplary communications system 900 includes an eNB 902 (e.g., a TRP) and a UE 904. In the exemplary communications system, the UE is configured (e.g., via RRC signaling and/or according to a communications standard) to detect and/or measure four BF CSI-RS resources (e.g., sets of time and frequency resources), although the UE may be configured to detect and/or measure one or more (i.e. K) BF CSI-RS resources to perform the described technique. Each BF CSI-RS resource could be associated with 1, 2, 4, or 8 ports corresponding to a particular beam pattern. The beam pattern could be a common beam pattern for all ports or a different beam pattern for each port. At 910, the eNB transmits four BF CSI-RSs using 1, 2, 4, or 8 antenna ports. The UE measures all K resources (that is, the K CSI-RS on the resources) and selects a best one for which to report CQI, PMI, and/or RI, assuming a closed-loop MIMO (CL-MIMO) transmission. At 912, the UE reports a wideband CSI-RS resource indicator (CRI) to the eNB indicating the CSI resource that the UE prefers and CSF, such as a CQI. PMI, and/or RI conditioned on the CSI-RS resource indicated by the CRI. At 914, the eNB transmits a data transmission, such as a PDSCH, with transmission parameters determined based on the CSF and the CSI-RS resource indicated by the CRI. While the example describes an eNB, the disclosure is not so limited, and the techniques described may be used in a communications system with a NodeB and/or one or more TRPs.

According to aspects of the present disclosure, a technique using a hybrid of CLASS B CSI-RS that involves different types of beamformed CSI-RS being supported to reduce CSI measurement complexity is provided. In one example, a UE may be configured to detect and/or measure 2 sets of beamformed CSI-RS. The first set is cell specific, while the second set is UE specific. In the hybrid CSI-RS technique. K>1 cell-specific beamformed CSI-RSs are transmitted by a TRP over a long duty-cycle for CSI-RS resource selection. Transmitting BF CSI-RSs over a long duty-cycle may allow the communications system to perform time division multiplexed (TDM) beam sweeping. A UE reports CRI of one or more preferred beams when the UE is configured to detect and/or measure multiple BF CSI-RS (i.e., K>1). An eNB uses the CRI(s) that the UE reports (i.e., CRI(s) indicating the preferred beam(s) of the UE) to determine a precoder to use in transmitting a UE-specific BF CSI-RS to the UE. When the eNB transmits the UE-specific BF CSI-RS, the eNB also configures the UE to detect one BF CSI-RS (i.e., K=1). When the UE is configured to detect one BF CSI-RS, the UE reports a short-term CSF including, for example, an RI, a PMI and/or a CQI. The UE assumes the transmission is transmitted using CL-MIMO when transmitting the CSF. When the UE reports PMI, it assumes CL MIMO precoding.

Figure 10:
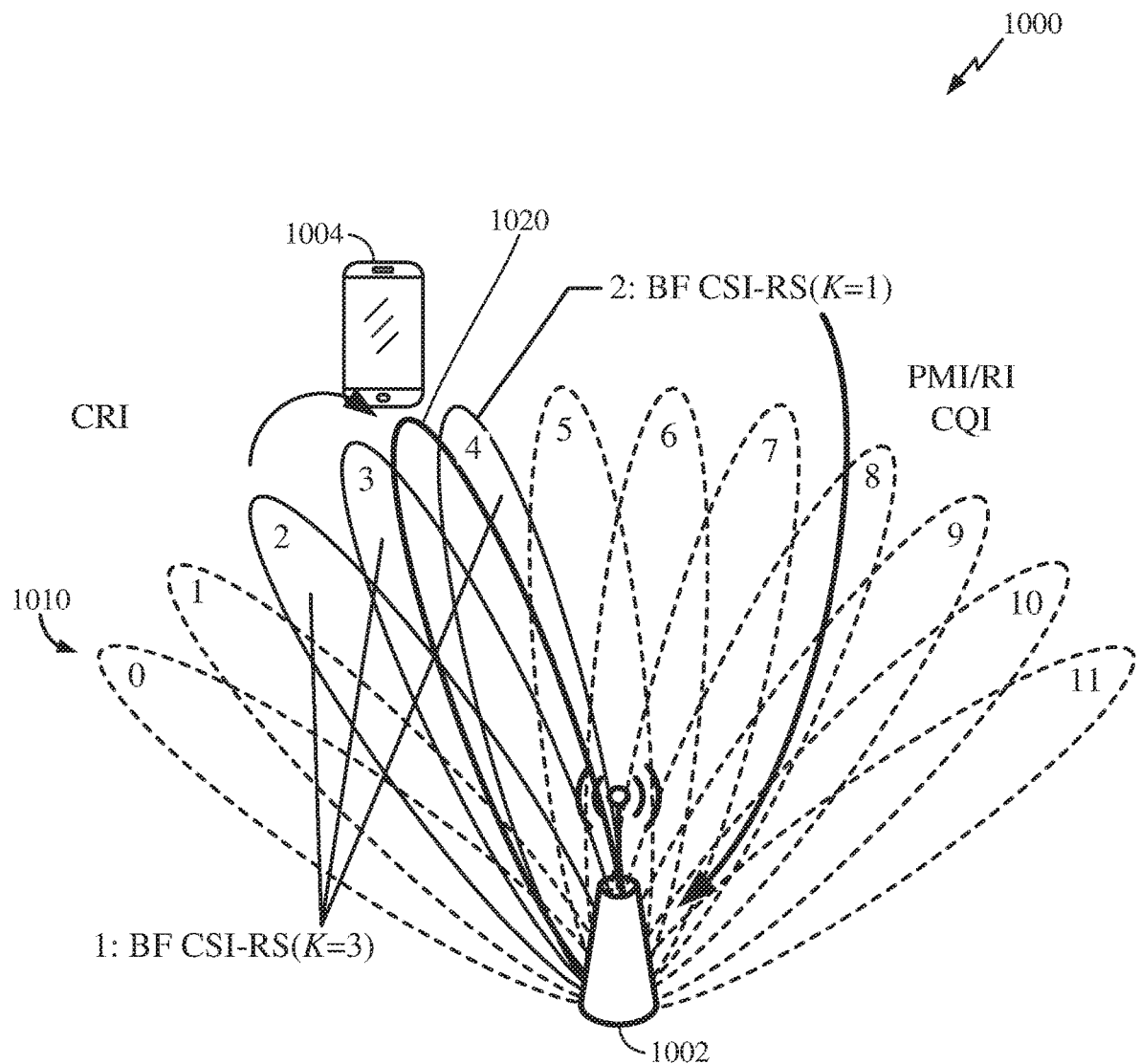
FIG. 10 shows an exemplary wireless communications system operating according to the hybrid CSI-RS technique.

FIG. 10 shows an exemplary wireless communications system 1000 operating according to the hybrid CSI-RS technique described above. The exemplary wireless communications system includes a TRP 1002 and a UE 1004, but the hybrid CSI-RS technique is suitable for use in communications systems including multiple TRPs, UEs. NodeBs, and/or eNodeBs. The BF CSI-RSs transmitted by the TRP over a long duty cycle are shown at 1010 and numbered 0-11. While 12 BF CSI-RSs are shown, the disclosed technique may be performed using more of fewer BF CSI-RSs. In the exemplary system, the UE begins being configured to detect and/or measure the three BF CSI-RSs (i.e., K=3), numbered 2, 3, and 4. The UE transmits a CRI indicating the CSI-RS resources preferred by the UE. The eNB uses the CRI(s) reported over time by the UE to determine a precoder to use in transmitting a UE-specific BF CSI-RS to the UE. The eNB transmits the UE-specific BF CSI-RS 1020 to the UE and configures the UE to detect one BF CSI-RS (i.e., K=1). The UE detects the UE-specific BF CSI-RS and transmits a PMI, an RI, and a CQI based on the UE-specific BF CSI-RS, assuming a CL-MIMO transmission.

In the exemplary techniques illustrated in FIGS. 9 and 10, a UE reports one or more CRIs for a best or preferred CSI-RS resource or set of CSI-RS resources to a BS (e.g., a TRP, a NodeB, an eNodeB). The UE determines the best or preferred CSI-RS resource(s) based on measurements of the BF CSI-RSs that the UE detects/and/or measures. For example, the UE may determine a best or preferred CSI-RS resource from the CSI-RSs that the UE detects and/or measures based on reference signal received power (RSRP), reference signal received quality (RSRQ), and/or signal-to-noise ratio measurements of each of the CSI-RSs.

The BF CSI-RS operation in LTE (described above with reference to FIG. 10) can be extended to NR, but limits dynamic beam selection for at least the following reasons, 1) As the CRI reporting is wideband-wise rather than subband-wise. CRI based dynamic beam selection can be supported in the time domain, but not in the frequency domain, 2) For OL-MIMO, a single beam transmission over the entire scheduled bandwidth may lose some frequency/spatial diversity, and subband-wise beam cycling is preferred, 3) When space frequency block coding (SFBC) is used for transmit diversity, it is also preferable to associate different layers to different beams for increased diversity, but the BF CSI-RS technique in LTE does not allow this, 4) Dynamic switching between CL-MIMO and OL-MIMO is not supported in the LTE BF CSI-RS technique, and this dynamic switching is expected to provide sizeable gains in some cases.

According to aspects of the present disclosure, for multiple beam transmission in NR, dynamic beam switching across spatial layers and (a set of) resource blocks can be supported. That is, different layers can be associated with different beams and different resource blocks can also be associated with different beams.

According to aspects of the present disclosure, for multiple beam transmission in NR, the beam selection can be transparent or non-transparent to a UE, based on whether multiple beams are from a single or multiple TRPs. That is, the beam selection can be transparent to a UE, if multiple beams are from the same TRP, or non-transparent if multiple beams are from different TRPs.

According to aspects of the present disclosure, for multiple beam transmission in NR, a UE may assume a reference transmission scheme for reporting CSI where there is dynamic beam switching across spatial layers and resource blocks.

According to aspects of the present disclosure, both UEs and BSs (e.g., TRPs, NodeBs, eNodeBs) may support both closed-loop and open-loop MIMO for multiple beam transmission in NR. That is, a BS may transmit signals on multiple beams using OL-MIMO, CL-MIMO, and/or both simultaneously (e.g., OL-MIMO to a first UE and CL-MIMO to a second UE), and UEs may receive and decode the transmissions on one or more of the beams that were sent using OL-MIMO and/or CL-MIMO. In addition. BSs may dynamically switch between CL-MIMO and OL-MIMO and vice-versa while transmitting to a UE without transmitting an indication of the switching, and the UE may receive and decode the transmissions.

According to aspects of the present disclosure, both UEs and BSs (e.g., TRPs, NodeBs, eNodeBs) may support dynamic beam switching across both spatial layers and resource blocks for multiple beam transmission in NR. That is, a BS may transmit different layers of a MIMO transmission using different beams and UEs may receive and decode the different layers of the transmission. Additionally or alternatively, a BS may transmit a signal using different beams on different resource blocks, and a UE may receive and decode the signal.

Figure 11:
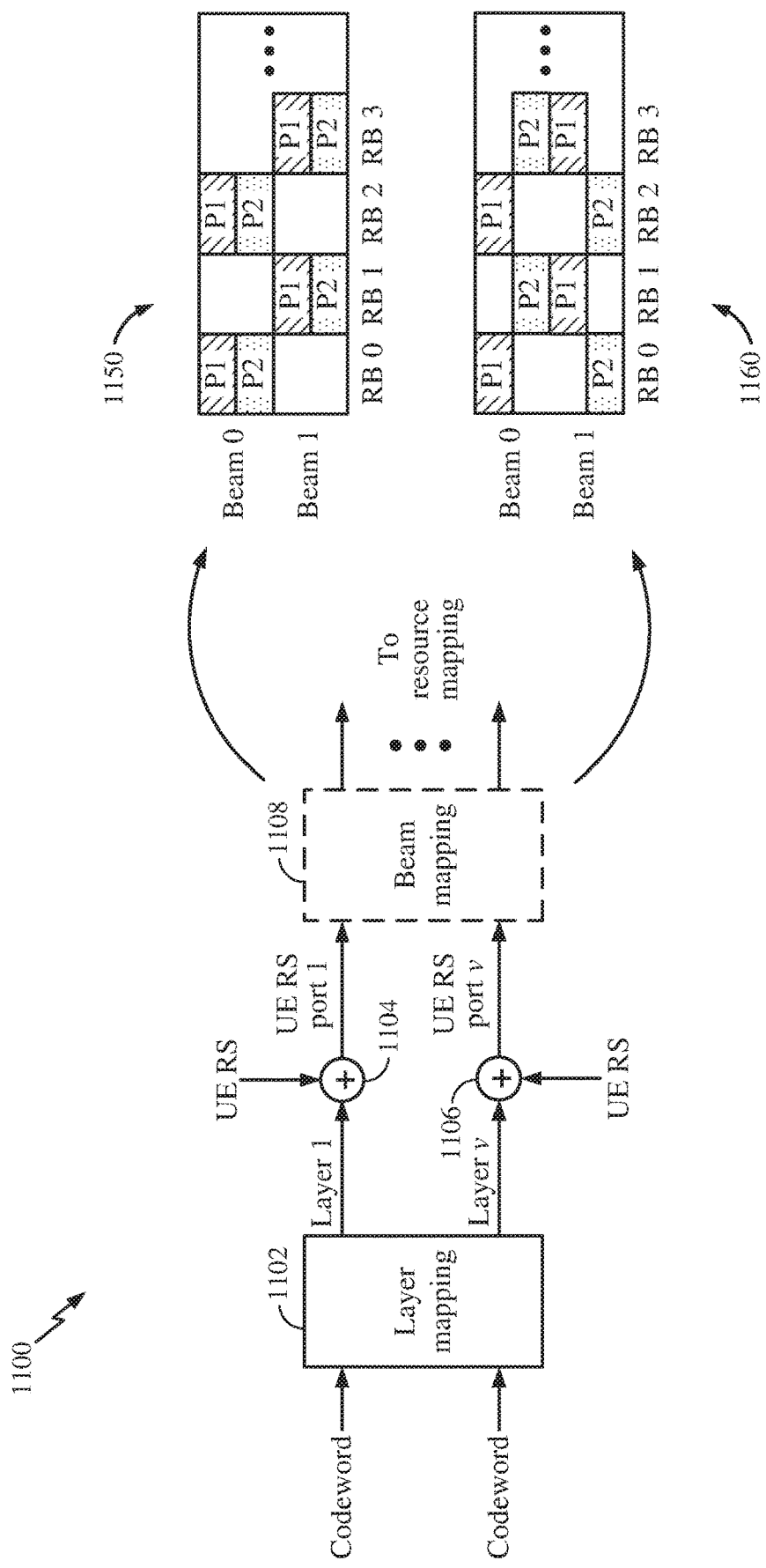
FIG. 11 illustrates a schematic of a transmit chain, in accordance with aspects of the present disclosure.

FIG. 11 is a schematic representation 1100 of an exemplary transmit chain that may be a component in a TRP and may transmit according to timelines 1150 and 1160, in accordance with aspects of the present disclosure. In the exemplary transmit chain, one or more codewords are obtained (e.g., from controller/processor 440 shown in FIG. 4) and mapped to layers by a layer mapping component 1102. The layer mapping component sends the streams of the layers to combiners 1104, 1106, which each adds UE-specific reference signals (UE-RS) to the corresponding stream and assigns the corresponding stream to a port. The streams are then mapped to corresponding beams by a beam mapping component 1108. The streams are then mapped to transmission resources (e.g., time and frequency resources), by, for example, a TX/MIMO processor 444, as shown in FIG. 4. As illustrated in exemplary transmit timeline 1150, the streams can be mapped such that beam switching occurs across RBs, but not across spatial layers. That is, the beam used for the transmission switches from RB to RB, but both layer 1 (e.g., the layer associated with the UE-RS on port 1) and layer 2 (e.g., the layer associated with the UE-RS on port 2) use the same beam in each RB. Additionally or alternatively, the streams can be mapped such that beam switching occurs across spatial layers and RBs, as shown in the exemplary transmit timeline 1160. That is, layer 1 is switches from beam 0 to beam 1 in alternating RBs, and layer 2 also switches from beam 1 to beam 0 in alternating RBs, but is always transmitted using a different beam than the beam used for layer 1.

According to aspects of the present disclosure, for beam based transmissions, antenna ports used for data transmission may be associated with a single TRP or multiple geographically separated TRPs. For transmissions from a single TRP, the data layer to antenna port mapping can be transparent to a receiving UE. That is, when a UE is receiving a MIMO transmission from a single TRP, the TRP can map the various layers of the MIMO transmission to various antenna ports and the UE can receive and decode the layers using parameters for the various beams used by the TRP for transmitting the MIMO transmission. For transmissions from multiple TRPs, intra-TRP layer-to-port mapping can be transparent to a receiving UE, similar to the case for transmissions from a single TRP. However, inter-TRP layer-to-port mapping is not transparent to a receiving UE. That is, the UE must receive and decode the various layers based on the mappings of layers to antenna ports and antenna ports to TRPs, as the UE must use the beam parameters corresponding to each TRP for receiving and decoding layers transmitted by that TRP.

According to aspects of the present disclosure. CSI reporting for dynamic beam switching may include a UE reporting a common RI and independent CQI and/or PMI for various beams. This technique may be used with both CL-MIMO transmissions and OL-MIMO transmissions.

According to aspects of the present disclosure, a UE may report CSI periodically or aperiodically. Additionally or alternatively, a UE may report each of RI. CQI, and PMI for various beams periodically or aperiodically. For example, a UE may be configured to report and may report: CQI periodically for all beams; RI and PMI periodically for a particular beam; and RI and PMI for other beams aperiodically (e.g., in response to a trigger from a BS).

According to aspects of the present disclosure, a UE may be configured (e.g., by a TRP, a NodeB, or an eNodeB) with K>1 beamformed CSI-RS resources for CSI reporting for supporting dynamic beam switching. The K resources may be associated with different TRPs. The UE reports K CQIs and/or PMIs, each corresponding to one BF CSI-RS resource. For a given BF CSI-RS resource, the UE determines the CQI and/or PMI assuming either a CL-MIMO or OL-MIMO transmission using the ports associated with the BF CSI-RS resource.

As used herein, "assuming a transmission" means obtaining, via a receiver, radio waves from a set of time and frequency resources and treating the radio waves as a signal (e.g., by attempting decoding) transmitted by another device. Similarly, an assumed transmission is the signal obtained from the obtained radio waves.

Figure 12:
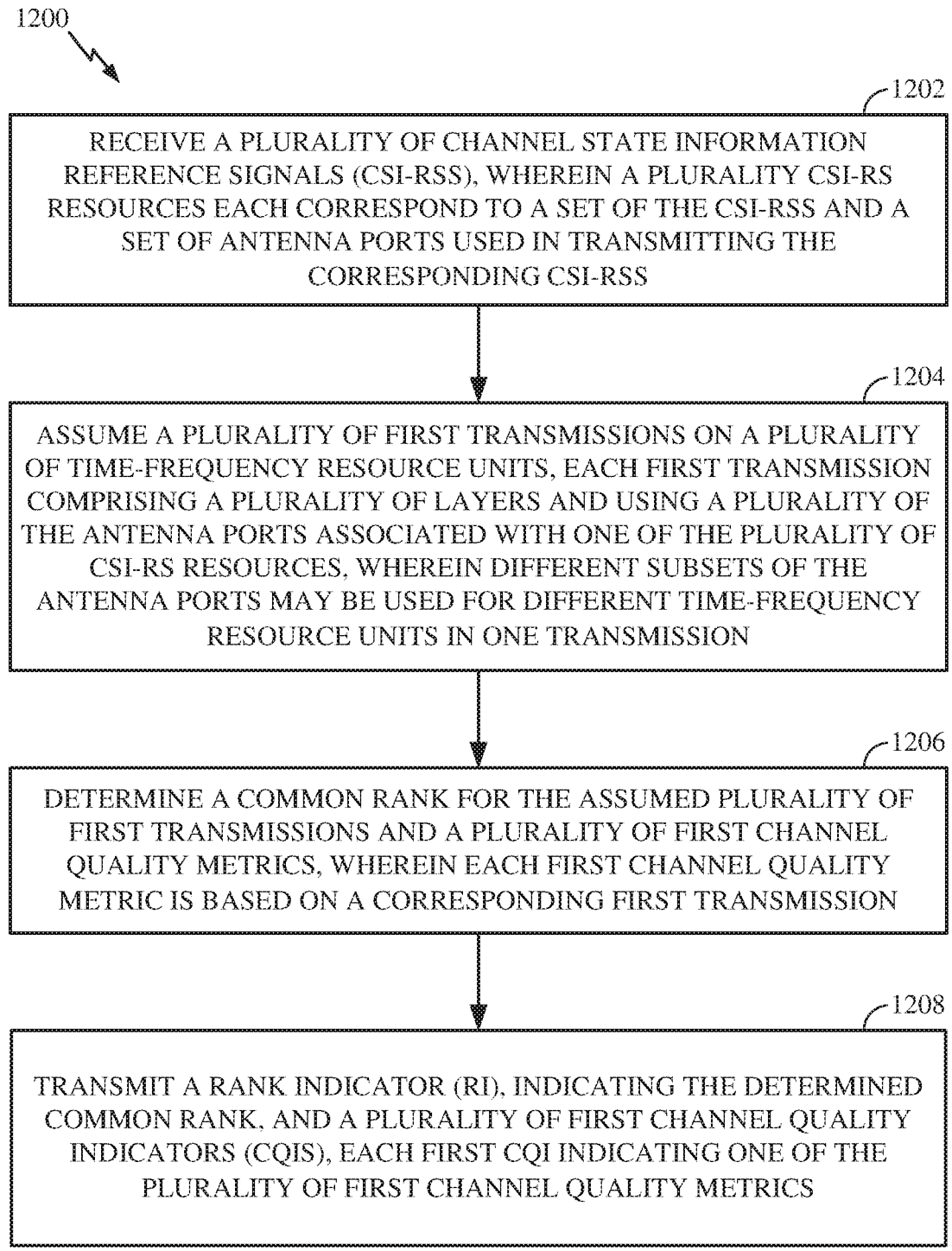
FIG. 12 shows example operations that may be performed by a UE, in accordance with aspects of the present disclosure.
Figure 12A:
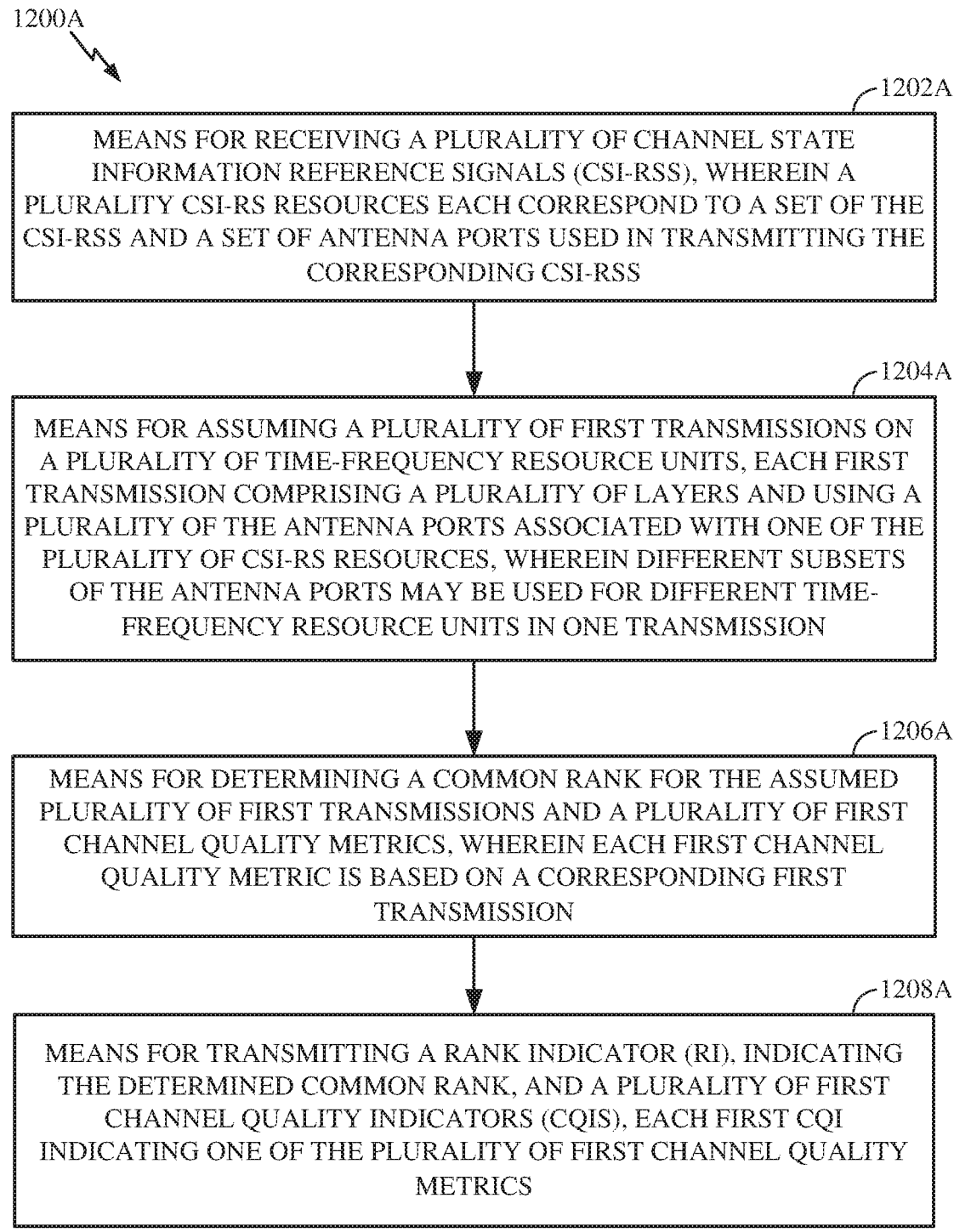
FIG. 12A illustrates example means capable of performing the operations shown in FIG. 12.

FIG. 12 shows example operations 1200 for reporting CSI for dynamic beam switching, in accordance with aspects of the present disclosure. Operations 1200 may be performed by a UE, such as UE 120 shown in FIG. 1, for example.

Operations 1200 begin at 1202 with receiving a plurality of channel state information reference signals (CSI-RSs), wherein a plurality of CSI-RS resources each correspond to a set of the CSI-RSs and a set of antenna ports used in transmitting the corresponding CSI-RSs.

At 1204, operations 1200 continue with assuming a plurality of first transmissions on a plurality of time-frequency resource units, each first transmission comprising a plurality of layers and using a plurality of the antenna ports associated with one of the plurality of CSI-RS resources, wherein different subsets of the antenna ports may be used for different time-frequency resource units in one transmission. Examples of time-frequency resource units include resource blocks and resource elements, discussed above with reference to FIG. 6.

Operations 1200 continue at 1206 with determining a common rank for the assumed plurality of first transmissions and a plurality of first channel quality metrics, wherein each first channel quality metric is based on a corresponding first transmission.

At 1208, operations 1200 conclude with transmitting a rank indicator (RI), indicating the determined common rank, and a plurality of first channel quality indicators (CQIs), each first CQI indicating one of the plurality of first channel quality metrics.

According to aspects of the present disclosure, a UE may report a best (e.g., determined based on RSRP, RSRQ, and/or SNR, as mentioned above) set of CRIs and an aggregated RI and/or CQI (for OL-MIMO) when reporting CSI for dynamic beam switching.

According to aspects of the present disclosure, a UE can be configured with K>1 beamformed CSI-RS resources for CSI reporting for supporting dynamic beam switching. The K resources may be associated with different TRPs. The UE may report a set of L CRIs, L≤K, to indicate that the beams associated with the corresponding resources are preferred by the UE for dynamic beam switching. The UE may obtain the value of L, for example, based on a configuration obtained by the UE from a BS and/or based on an indication (e.g., a signal) received from a BS. The UE may also report a single aggregated RI and/or CQI, assuming an OL-MIMO transmission (e.g., using beam and/or port cycling, as described above with reference to FIG. 11) using the ports associated with the L selected resources.

According to aspects of the present disclosure, a UE can be configured to report, and may report, CSI for beams periodically, aperiodically, or a combination thereof. For example, a UE may be configured to report CSI for a first beam periodically, and to report CSI for other beams aperiodically (e.g., in response to a trigger). In the example, the UE may report CSI for the first beam periodically, and report CSI for a second beam in response to a request from a BS to report CSI for the second beam.

Figure 13:
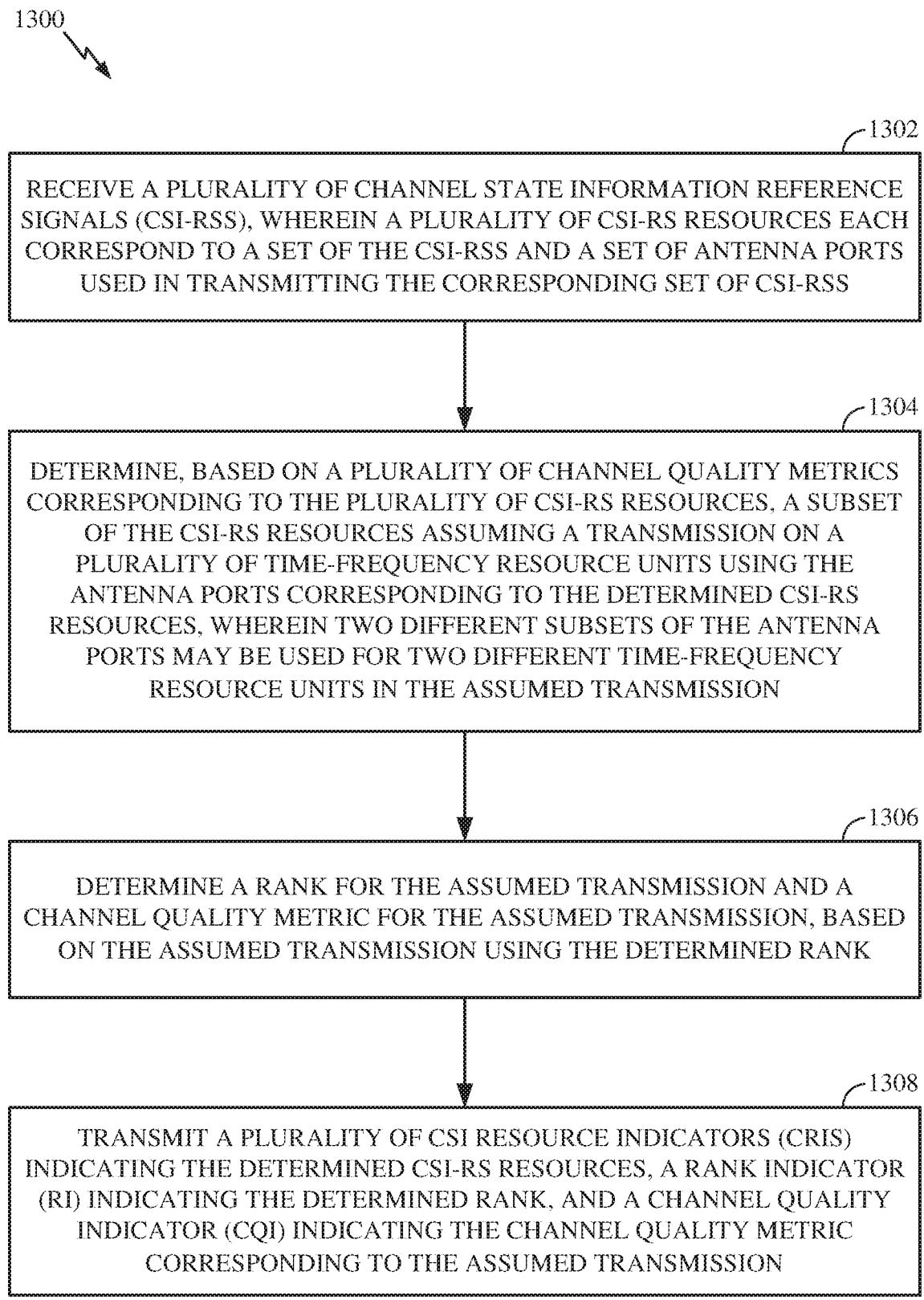
FIG. 13 shows example operations that may be performed by a UE, in accordance with aspects of the present disclosure.
Figure 13A:
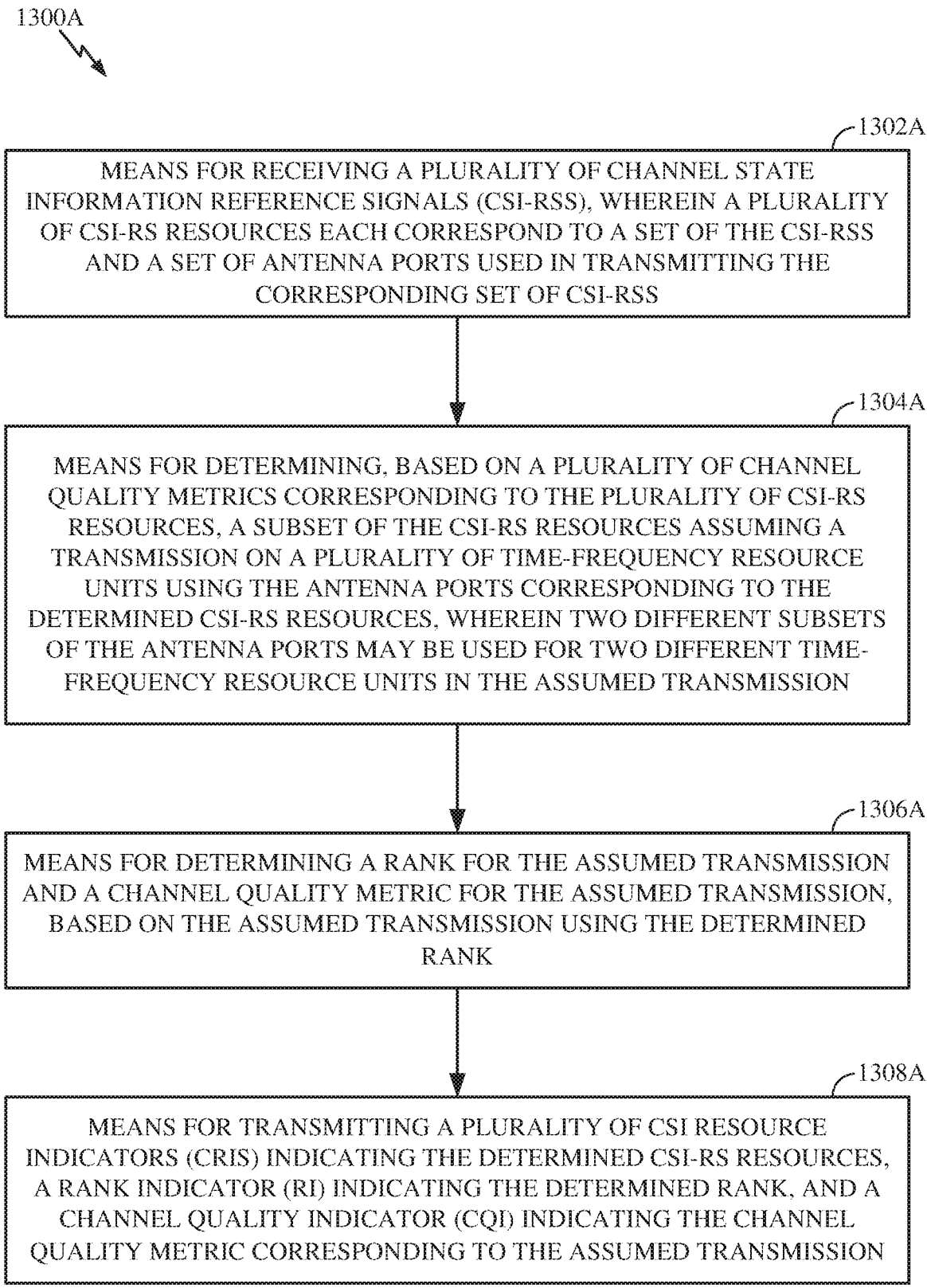
FIG. 13A illustrates example means capable of performing the operations shown in FIG. 13.

FIG. 13 shows example operations 1300 for reporting CSI for dynamic beam switching, in accordance with aspects of the present disclosure. Operations 1300 may be performed by a UE, such as UE 120 shown in FIG. 1, for example.

Operations 1300 begin at 1302 with receiving a plurality of channel state information reference signals (CSI-RSs), wherein a plurality of CSI-RS resources each correspond to a set of the CSI-RSs and a set of antenna ports used in transmitting the corresponding set of CSI-RSs.

At 1304, operations 1300 continue with determining, based on a plurality of channel quality metrics corresponding to the plurality of CSI-RS resources, a subset of the CSI-RS resources assuming a transmission on a plurality of time-frequency resource units using the antenna ports corresponding to the determined CSI-RS resources, wherein two different subsets of the antenna ports may be used for two different time-frequency resource units in the assumed transmission. The channel quality metrics may be, for example, a reference signal received power (RSRP), a reference signal received quality (RSRQ), and/or a signal-to-noise ratio (SNR) measured and/or calculated by a UE receiving the CSI-RSs.

Operations 1300 continue at 1306 with determining a rank for the assumed transmission and a channel quality metric for the assumed transmission, based on the assumed transmission using the determined rank.

At 1308, operations 1300 conclude with transmitting a plurality of CSI resource indicators (CRIs) indicating the determined CSI-RS resources, a rank indicator (RI) indicating the determined rank, and a channel quality indicator (CQI) indicating the channel quality metric corresponding to the assumed transmission.

According to aspects of the present disclosure, may include a UE may report a set of best reference CRI(s) and an aggregated RI/CQI (for OL-MIMO) when reporting CSI for dynamic beam switching.

According to aspects of the present disclosure, a UE can be configured with K>1 beamformed CSI-RS resources for CSI reporting for supporting dynamic beam switching. The beamformed CSI-RS resources maybe associated with a same TRP or different TRPs. The UE may report a set of L CRIs, L≤K, to indicate that the beams associated with the corresponding resources shall be considered as a set of reference beams. The UE may derive a set of candidate beams for aggregated RI and/or CQI reporting, based on the set of reference beams under certain predetermined criteria. For example, all beams orthogonal to any beams in the reference set belong to the candidate beam set. The UE may report a single aggregated RI and/or CQI, assuming an OL-MIMO transmission (e.g., using beam and/or port cycling, as described above with reference to FIG. 11) using the ports associated with the candidate beams.

Additionally or alternatively, a UE may be configured with K>1 cell-specific BF CSI-RS resources and a UE-specific BF CSI-RS resource for CSI reporting for supporting dynamic beam switching. The UE may report a set of L CRIs, where L is less than or equal to K, to indicate that the beams associated with the corresponding cell-specific resources shall be considered as a set of reference beams. The UE may also report a single RI based on the reference beams. In different subframes, the UE-specific CSI-RS and/or transmissions to the UE can be beamformed using different beamformers derived from the reference beams. The UE may also report CQI and/or PMI based on a UE-specific CSI-RS, assuming either an OL-MIMO or a CL-MIMO transmission scheme.

If the UE assumes an OL-MIMO transmission scheme, then the UE may report aggregated CQI for a given window of time. Aggregation windows can be either explicitly or implicitly indicated to the UE. That is, a BS (e.g., a TRP, a NodeB, an eNodeB) may determine a window of time for which a UE is to report aggregated CQI and signal the window or implicitly indicate the window to the UE. The UE may then report aggregated CQI for the indicated window of time.

Figure 14:
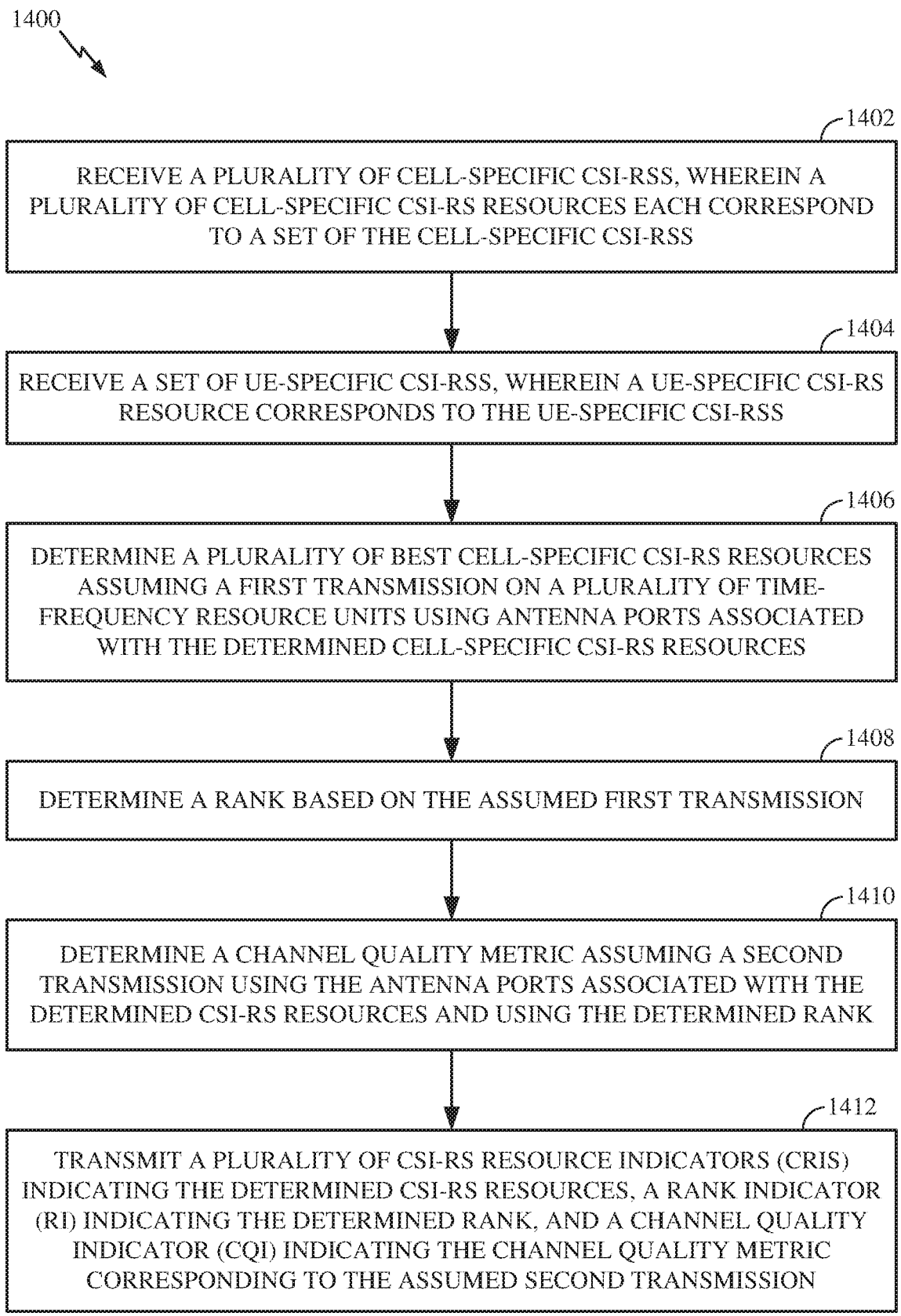
FIG. 14 shows example operations that may be performed by a UE, in accordance with aspects of the present disclosure.
Figure 14A:
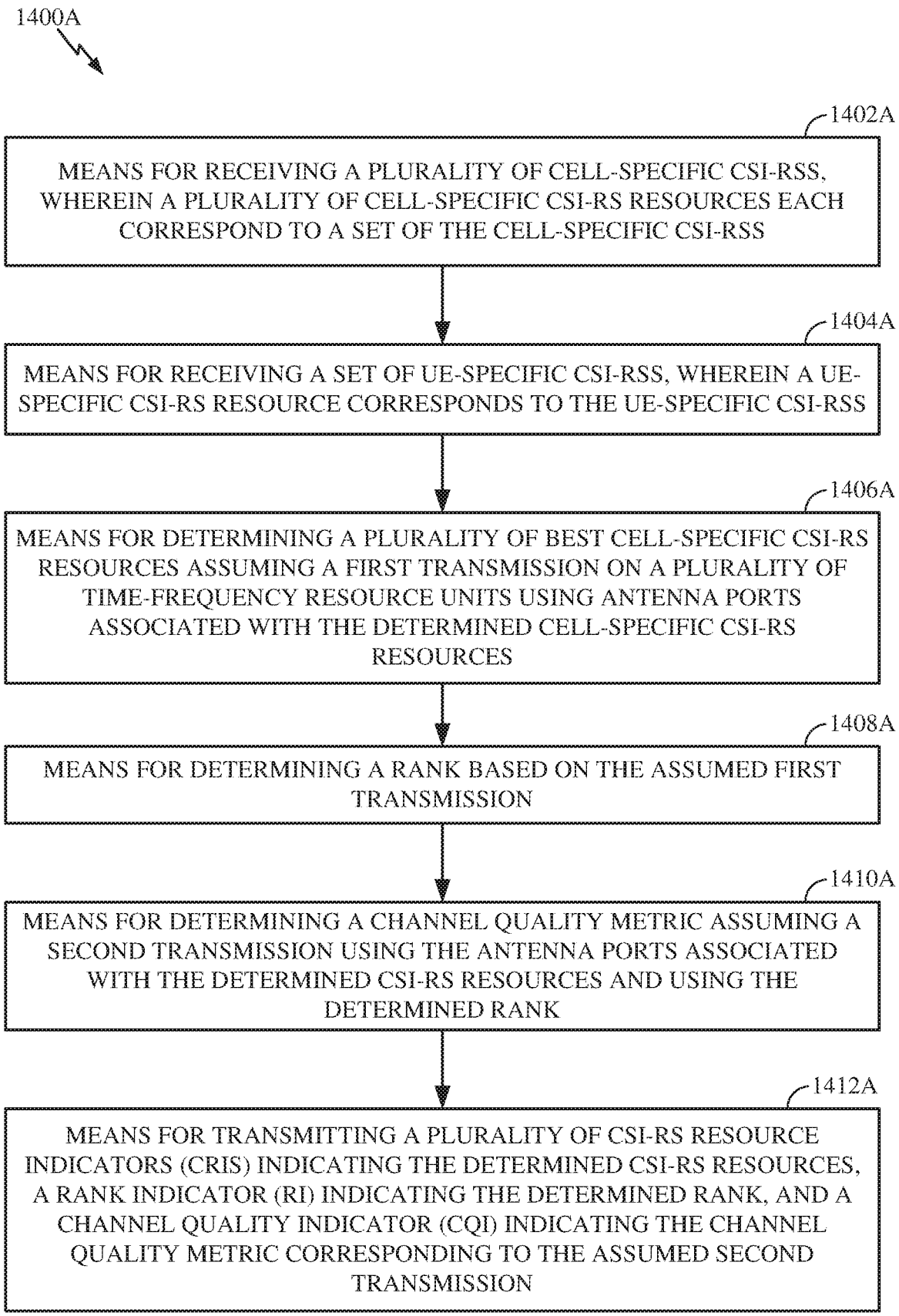
FIG. 14A illustrates example means capable of performing the operations shown in FIG. 14.

FIG. 14 shows example operations 1400 for wireless communications, in accordance with aspects of the present disclosure. Operations 1400 may be performed by a UE, such as UE 120 shown in FIG. 1, for example.

Operations 1400 begin at 1402 with receiving a plurality of cell-specific CSI-RSs, wherein a plurality of cell-specific CSI-RS resources each correspond to a set of the cell-specific CSI-RSs.

At 1404, operations 1400 continue with receiving a set of UE-specific CSI-RSs, wherein a UE-specific CSI-RS resource corresponds to the UE-specific CSI-RSs.

Operations 1400 continue at 1406 with determining a plurality of best cell-specific CSI-RS resources assuming a first transmission on a plurality of time-frequency resource units using antenna ports associated with the determined cell-specific CSI-RS resources.

At 1408, operations 1400 continue with determining a rank based on the assumed first transmission.

Operations 1400 continue at 1410 with determining a channel quality metric assuming a second transmission using the antenna ports associated with the determined CSI-RS resources and using the determined rank.

At 1412, operations 1400 conclude with transmitting a plurality of CSI-RS resource indicators (CRIs) indicating the determined CSI-RS resources, a rank indicator (RI) indicating the determined rank, and a channel quality indicator (CQI) indicating the channel quality metric corresponding to the second assumed transmission.

According to aspects of the present disclosure. CSI reporting for dynamic beam switching may include two-level CRI reporting, with one level for CL-MIMO transmissions and another level for OL-MIMO transmissions.

According to aspects of the present disclosure, a UE may be configured (e.g., by a TRP, a NodeB, an eNodeB) with a plurality (i.e., K>1) of sets of beamformed CSI-RS resources for CSI reporting for supporting dynamic beam switching. The K sets of resources may be associated with different TRPs. The UE may report a first level wideband CRI to indicate that the beam(s) associated with the resource set corresponding to the CRI are preferred by the UE for dynamic beam switching. The UE may report a second level subband CRI to indicate a best beam (e.g., determined based on SNR. RSRP, and/or RSRQ of the preferred beams) in the selected resource set for the given subband.

For OL-MIMO transmissions, the UE may not report the second level subband CRI. The UE may report a single aggregated RI and/or CQI, with the UE calculating the RI and/or CQO assuming cycling of the beams associated with the selected resource set.

Figure 15:
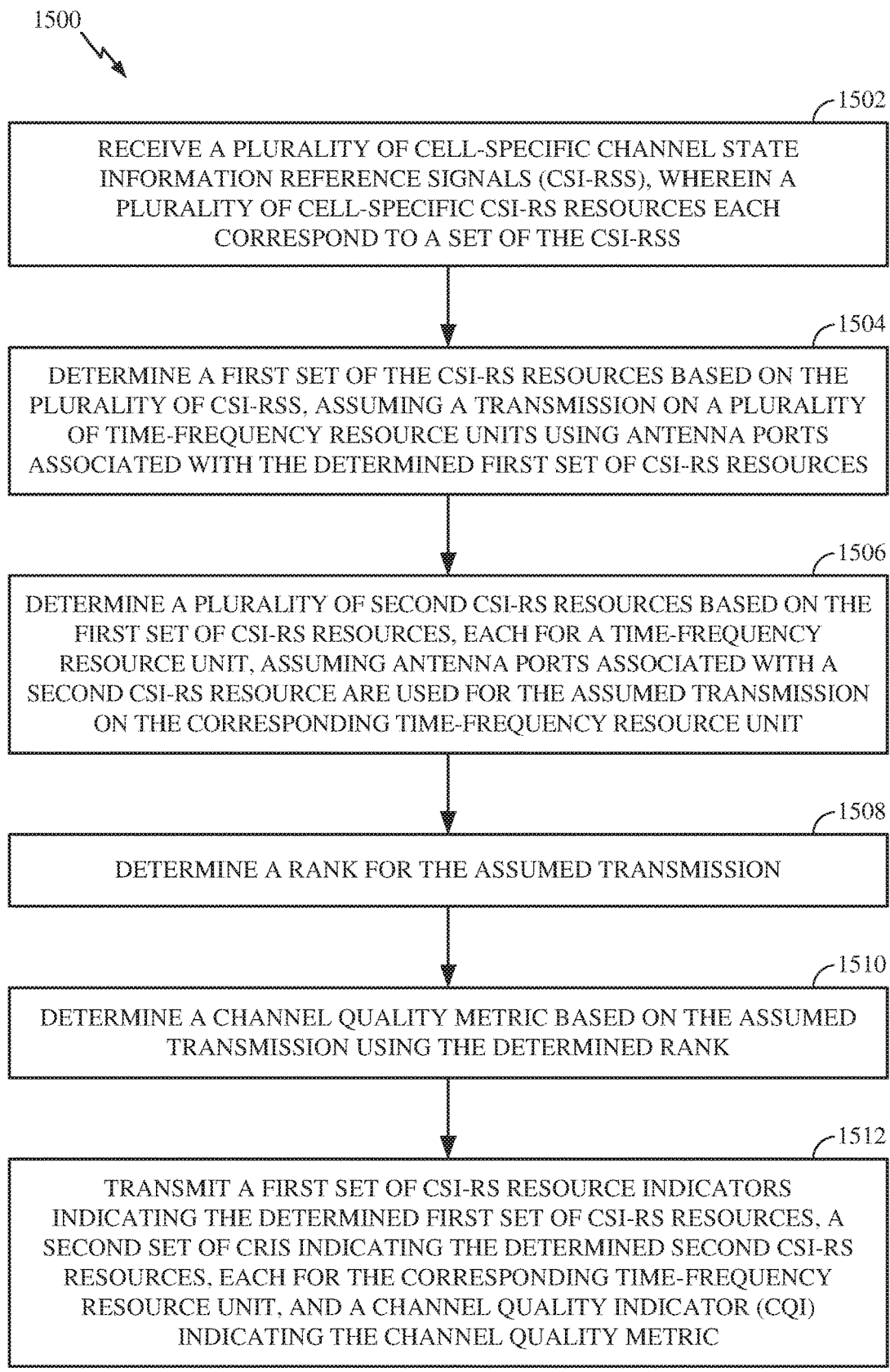
FIG. 15 shows example operations that may be performed by a UE, in accordance with aspects of the present disclosure.
Figure 15A:
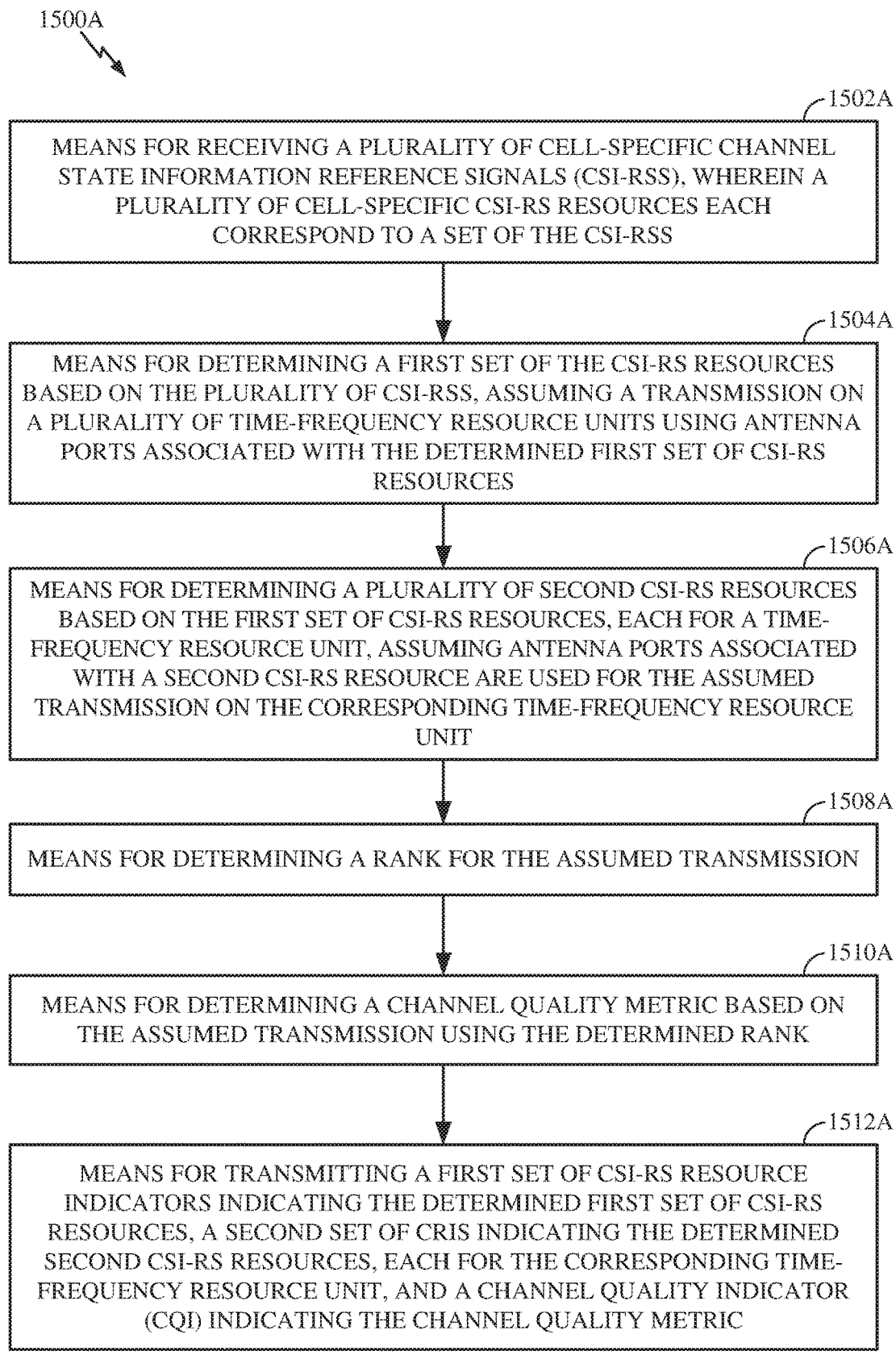
FIG. 15A illustrates example means capable of performing the operations shown in FIG. 15.

FIG. 15 shows example operations 1500 for wireless communications, in accordance with aspects of the present disclosure. Operations 1500 may be performed by a UE, such as UE 120 shown in FIG. 1, for example.

Operations 1500 begin at 1502 with receiving a plurality of channel state information reference signals (CSI-RSs), wherein a plurality of CSI-RS resources each correspond to a set of the CSI-RSs.

At 1504, operations 1500 continue with determining a first set of the CSI-RS resources based on the plurality of CSI-RSs, assuming a transmission on a plurality of time-frequency resource units using antenna ports associated with the determined set of CSI-RS resources.

Operations 1500 continue at 1506 with determining a plurality of second CSI-RS resources based on the first set of CSI-RS resources, each for a time-frequency resource unit, assuming antenna ports associate with a second CSI-RS resource are used for the assumed transmission on the corresponding time-frequency resource unit.

At 1508, operations 1500 continue with determining a rank for the assumed transmission.

Operations 1500 continue at 1510 with determining a channel quality metric based on the assumed transmission using the determined rank.

At 1512, operations 1500 conclude with transmitting a first set of CSI-RS resource indicators (CRIs) indicating the determined first set of CSI-RS resources, a second set of CRIs indicating the determined second CSI-RS resources, each for the corresponding time-frequency resource unit, and a channel quality indicator (CQI) indicating the channel quality metric.

According to aspects of the present disclosure, the plurality of CSI-RS resources may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

According to aspects of the present disclosure, a UE may report subband-specific CRIs when reporting CSI reporting for dynamic beam switching for both CL-MIMO transmissions and OL-MIMO transmissions.

According to aspects of the present disclosure, a UE may be configured with a plurality (i.e., K>1) of beamformed CSI-RS resources for CSI reporting for supporting dynamic beam switching. The UE may report a best M CRIs, where the best CRI in the set of M CRIs is indicated, and the subband indices corresponding to each CRI. Additionally or alternatively, a UE may report a set of best CRIs, with each CRI corresponding to a respective set of subbands.

Figure 16:
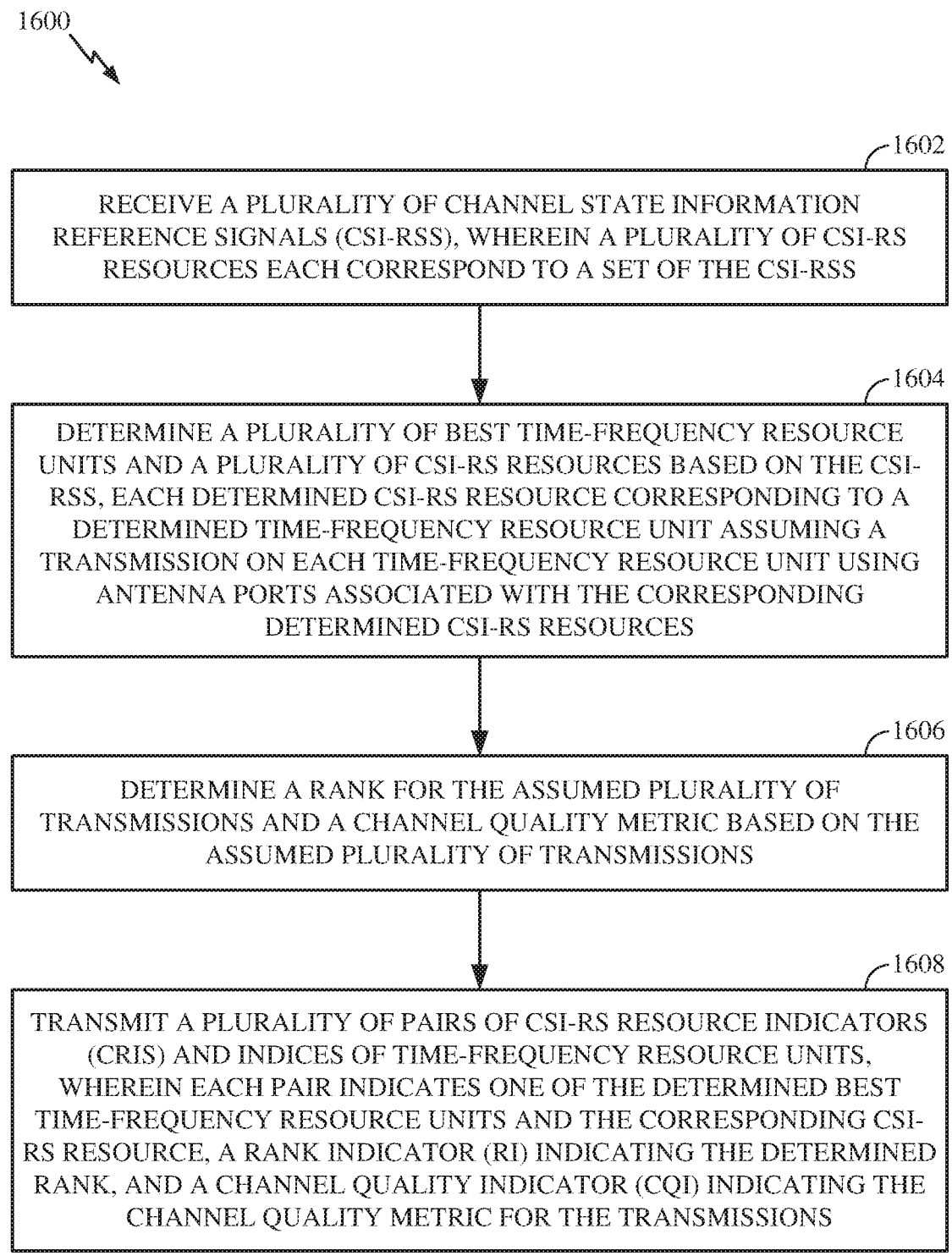
FIG. 16 shows example operations that may be performed by a UE, in accordance with aspects of the present disclosure.
Figure 16A:
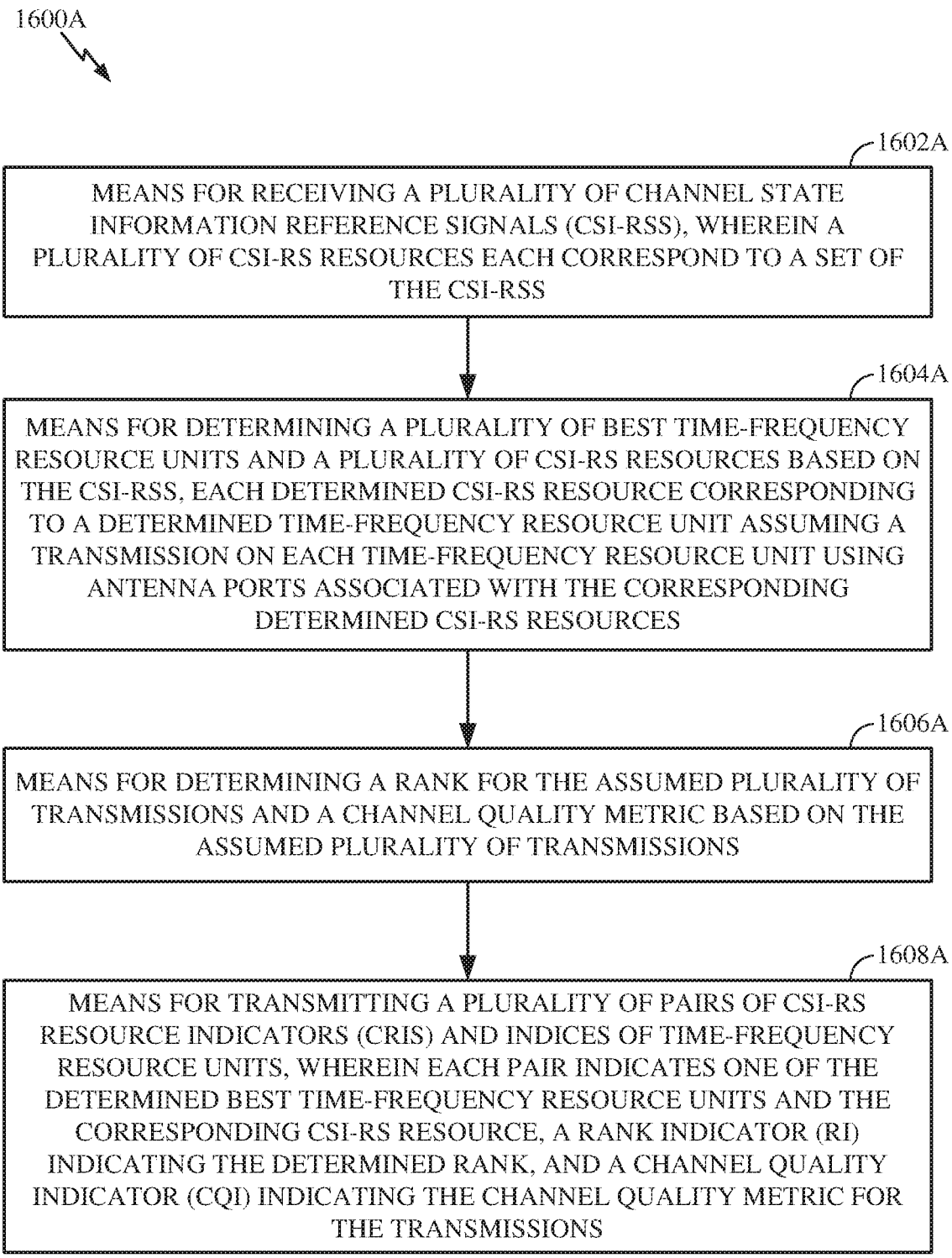
FIG. 16A illustrates example means capable of performing the operations shown in FIG. 16.

FIG. 16 shows example operations 1600 for reporting CSI for dynamic beam switching, in accordance with aspects of the present disclosure. Operations 1600 may be performed by a UE, such as UE 120 shown in FIG. 1, for example.

Operations 1600 begin at 1602 with receiving a plurality of channel state information reference signals (CSI-RSs), wherein a plurality of CSI-RS resources each correspond to a set of the CSI-RSs.

At 1604, operations 1600 continue with determining a plurality of best time-frequency resource units and a plurality of CSI-RS resources based on the CSI-RSs, each determined CSI-RS resource corresponding to a determined time-frequency resource unit assuming a transmission on each time-frequency resource unit using antenna ports associated with the corresponding determined CSI-RS resources.

Operations 1600 continue at 1606 with determining a rank for the assumed plurality of transmissions and a channel quality metric based on the assumed plurality of transmissions.

At 1608, operations 1600 conclude with transmitting a plurality of pairs of CSI-RS resource indicators (CRIs) and indices of time-frequency resource units, wherein each pair indicates one of the determined best time-frequency resource units and the corresponding CSI-RS resource, a rank indicator (RI) indicating the determined rank, and a channel quality indicator (CQI) indicating the channel quality metric for the transmission.

According to aspects of the present disclosure, the plurality of CSI-RS resources may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

According to aspects of the present disclosure, a UE may report both CL-MIMO and OL-MIMO based CSI feedback, in a same or separate reports. A TRP receiving the reports from the UE may choose the transmission scheme (i.e., CL-MIMO or OL-MIMO) dynamically, based on the reports from the UE.

According to aspects of the present disclosure, a UE may be triggered (i.e., aperiodic CSI (A-CSI)) to report CSI assuming an OL-MIMO-only transmission scheme, a CL-MIMO-only transmission scheme, or a transmission scheme using both OL-MIMO and CL-MIMO transmissions. That is, the CSI reporting for dynamic multi-beam transmissions can be similar to current A-CSI reporting when used with carrier aggregation (CA) or coordinated multi-point transmission (CoMP), where one or more set of CSIs are configured on a UE for reporting by the UE. Each CSI measurement set can be associated with a specific transmission scheme, e.g., one for OL-MIMO, and one for CL-MIMO. The triggering of A-CSI reporting may include an indication of the CSI measurement set to support dynamic CSI reporting for different transmission schemes.

FIGS. 17-23 illustrate exemplary operations for reporting CSI for dynamic beam switching, in accordance with aspects of the present disclosure described above.

Figure 17:
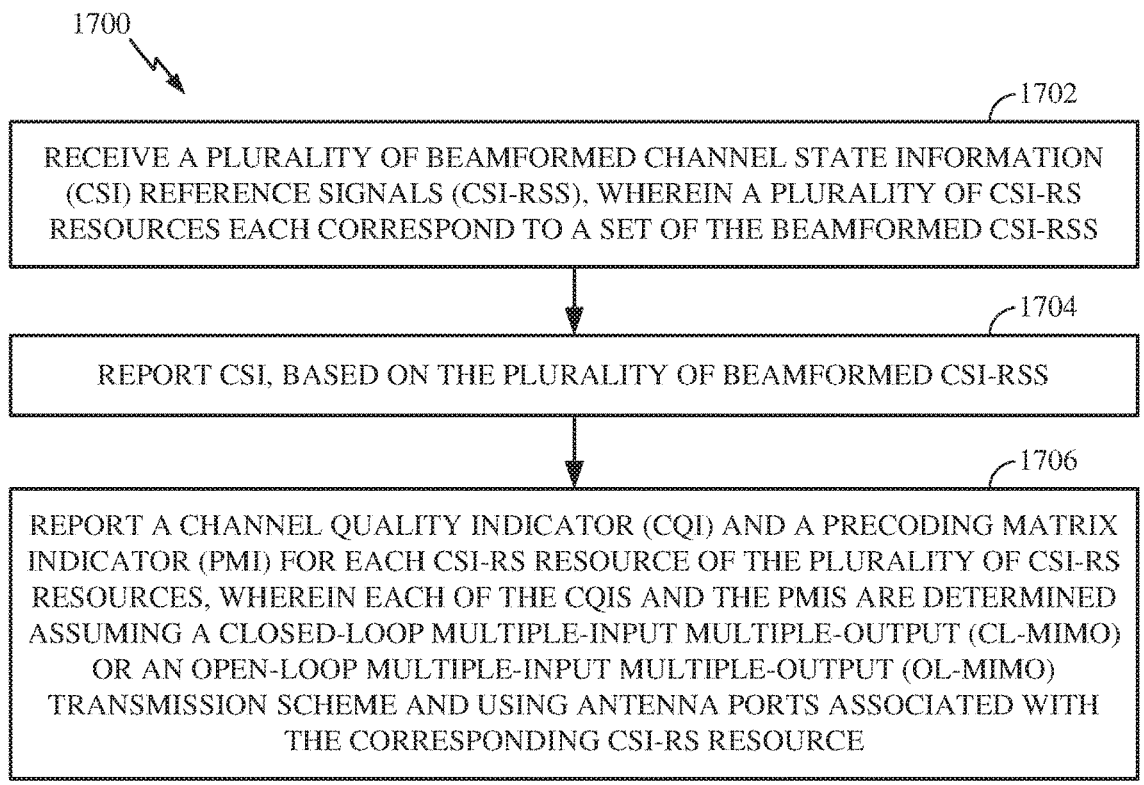
FIG. 17 shows example operations that may be performed by a UE, in accordance with aspects of the present disclosure.
Figure 17A:
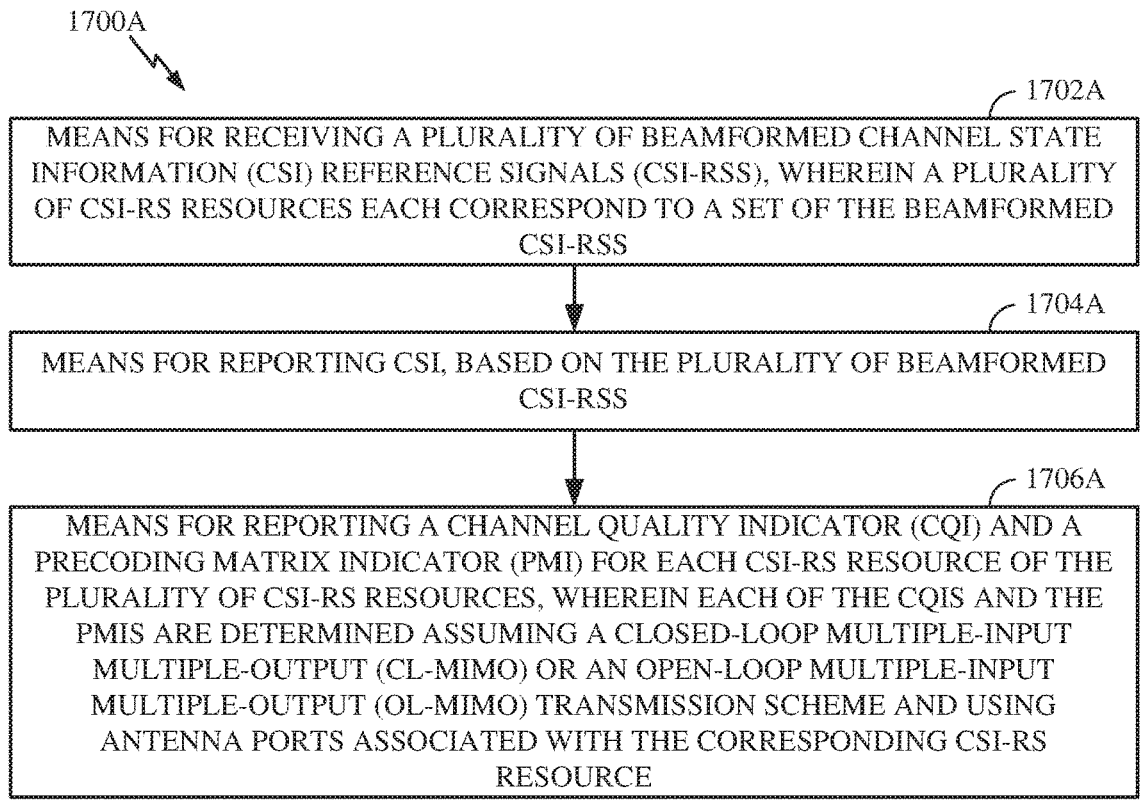
FIG. 17A illustrates example means capable of performing the operations shown in FIG. 17.

FIG. 17 illustrates exemplary operations 1900 for reporting CSI for beam switching, in accordance with aspects of the present disclosure. Operations 1700 may be performed by a UE, such as UE 120 shown in FIG. 1, for example.

Operations 1700 begin at block 1702, where the UE receives a plurality of beamformed channel state information (CSI) reference signals (CSI-RSs), wherein a plurality of CSI-RS resources each correspond to a set of the beamformed CSI-RSs. For example, the UE may receive the CSI-RSs from one or more TRPs, such as NodeB 110, shown in FIG. 1.

At block 1704, operations 1700 continue with the UE reporting CSI, based on the plurality of beamformed CSI-RSs.

Operations 1700 conclude at block 1706 with the UE reporting a channel quality indicator (CQI) and a precoding matrix indicator (PMI) for each CSI-RS resource of the plurality of CSI-RS resources, wherein each of the CQIs and the PMIs are determined assuming a closed-loop multiple-input (CL-MIMO) or an open-loop multiple-input multiple-output (MIMO) transmission scheme and using antenna ports associated with the corresponding CSI-RS resource.

According to aspects of the present disclosure, the plurality of CSI-RS resources may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

Figure 18:
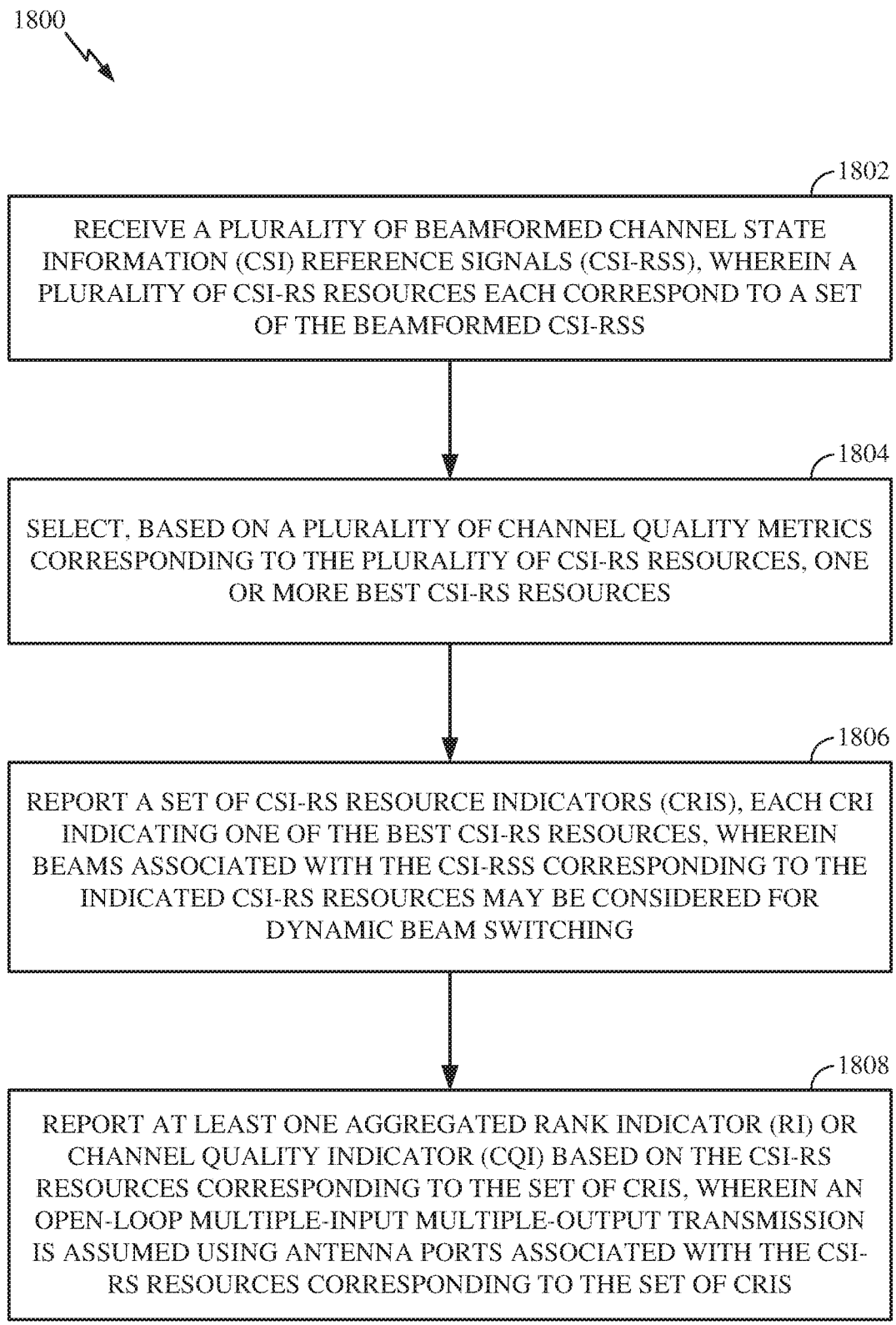
FIG. 18 shows example operations that may be performed by a UE, in accordance with aspects of the present disclosure.
Figure 18A:
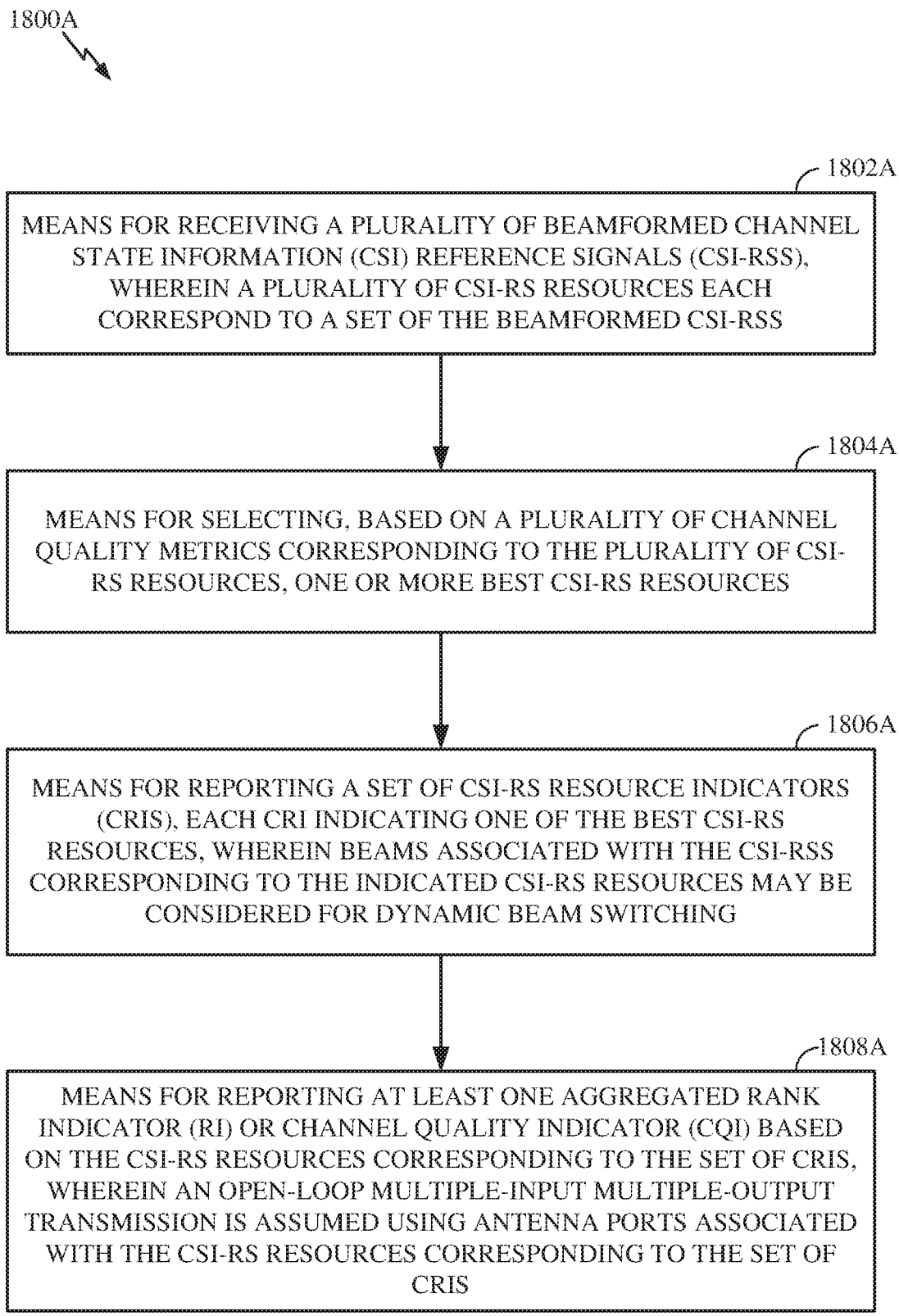
FIG. 18A illustrates example means capable of performing the operations shown in FIG. 18.

FIG. 18 illustrates exemplary operations 1800 for reporting CSI for beam switching, in accordance with aspects of the present disclosure. Operations 1800 may be performed by a UE, such as UE 120 shown in FIG. 1, for example.

Operations 1800 begin at block 1802 with the UE receiving a plurality of beamformed channel state information (CSI) reference signals (CSI-RSs), wherein a plurality of CSI-RS resources each correspond to a set of the beamformed CSI-RSs.

At block 1804, operations 1800 continue with the UE selecting, based on a plurality of channel quality metrics corresponding to the plurality of CSI-RS resources, one or more best CSI-RS resources.

Operations 1800 continue at block 1806 with the UE reporting a set of CSI-RS resource indicators (CRIs), each CRI indicating one of the best CSI-RS resources, wherein beams associated with the CSI-RSs corresponding to the indicated CSI-RS resources may be considered for dynamic beam switching.

At block 1808, operations 1800 conclude with the UE reporting at least one aggregated rank indicator (RI) or channel quality indicator (CQI) based on the CSI-RS resources corresponding to the set of CRIs, wherein an open-loop multiple-input multiple-output (OL-MIMO) transmission is assumed using antenna ports associated with the CSI-RS resources corresponding to the set of CRIs.

According to aspects of the present disclosure, the plurality of CSI-RS resources may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

Figure 19:
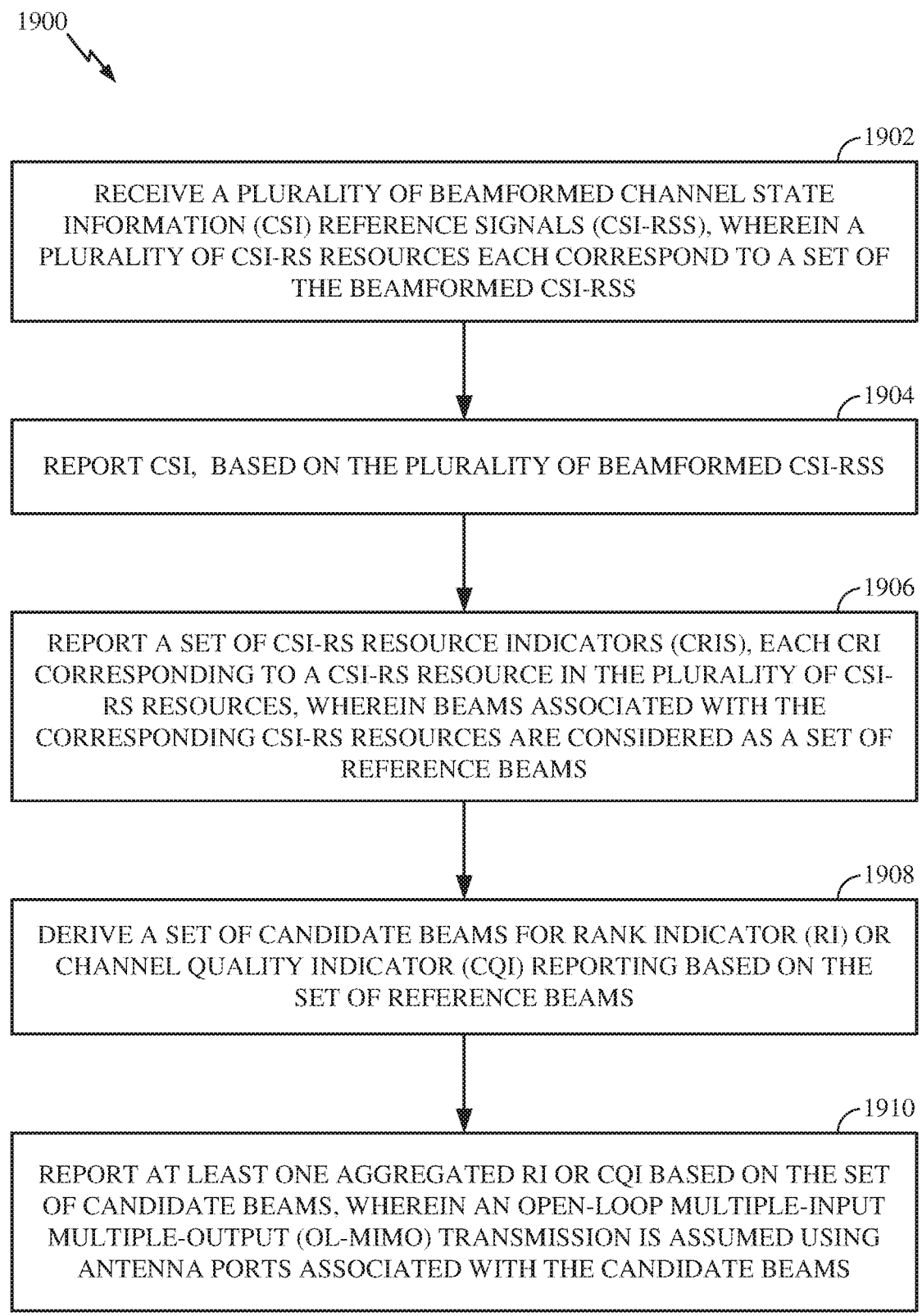
FIG. 19 shows example operations that may be performed by a UE, in accordance with aspects of the present disclosure.
Figure 19A:
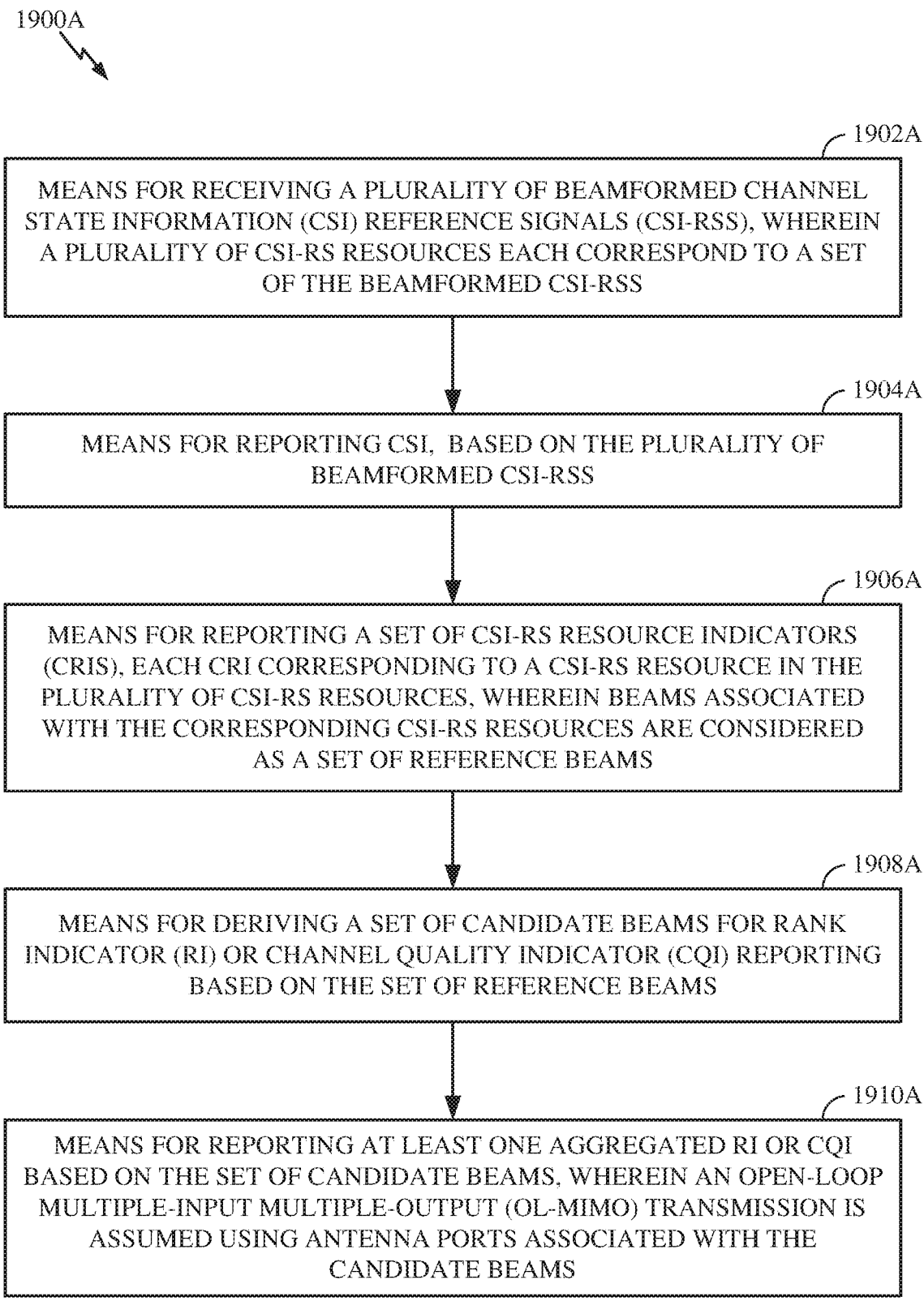
FIG. 19A illustrates example means capable of performing the operations shown in FIG. 19.

FIG. 19 illustrates exemplary operations 1900 for reporting CSI for beam switching, in accordance with aspects of the present disclosure. Operations 1900 may be performed by a UE, such as UE 120 shown in FIG. 1, for example.

Operations 1900 begin at block 1902 with the UE receiving a plurality of beamformed channel state information (CSI) reference signals (CSI-RSs), wherein a plurality of CSI-RS resources each correspond to a set of the beamformed CSI-RSs.

At block 1904, operations 1900 continue with the UE reporting CSI, based on the plurality of beamformed CSI-RSs.

Operations 1900 continue at block 1906, where the UE reports a set of CSI-RS resource indicators (CRIs), each CRI corresponding to a CSI-RS resource in the plurality of CSI-RS resources, wherein beams associated with the corresponding CSI-RS resources are considered as a set of reference beams.

At block 1908, operations 1900 continue with the UE deriving a set of candidate beams for rank indicator (RI) or channel quality indicator (CQI) reporting based on the set of reference beams.

Operations 1900 conclude at block 1910 with the UE reporting at least one aggregated RI or CQI based on the set of candidate beams, wherein an open-loop multiple-input multiple-output (MIMO) transmission is assumed using antenna ports associated with the candidate beams.

Figure 20:
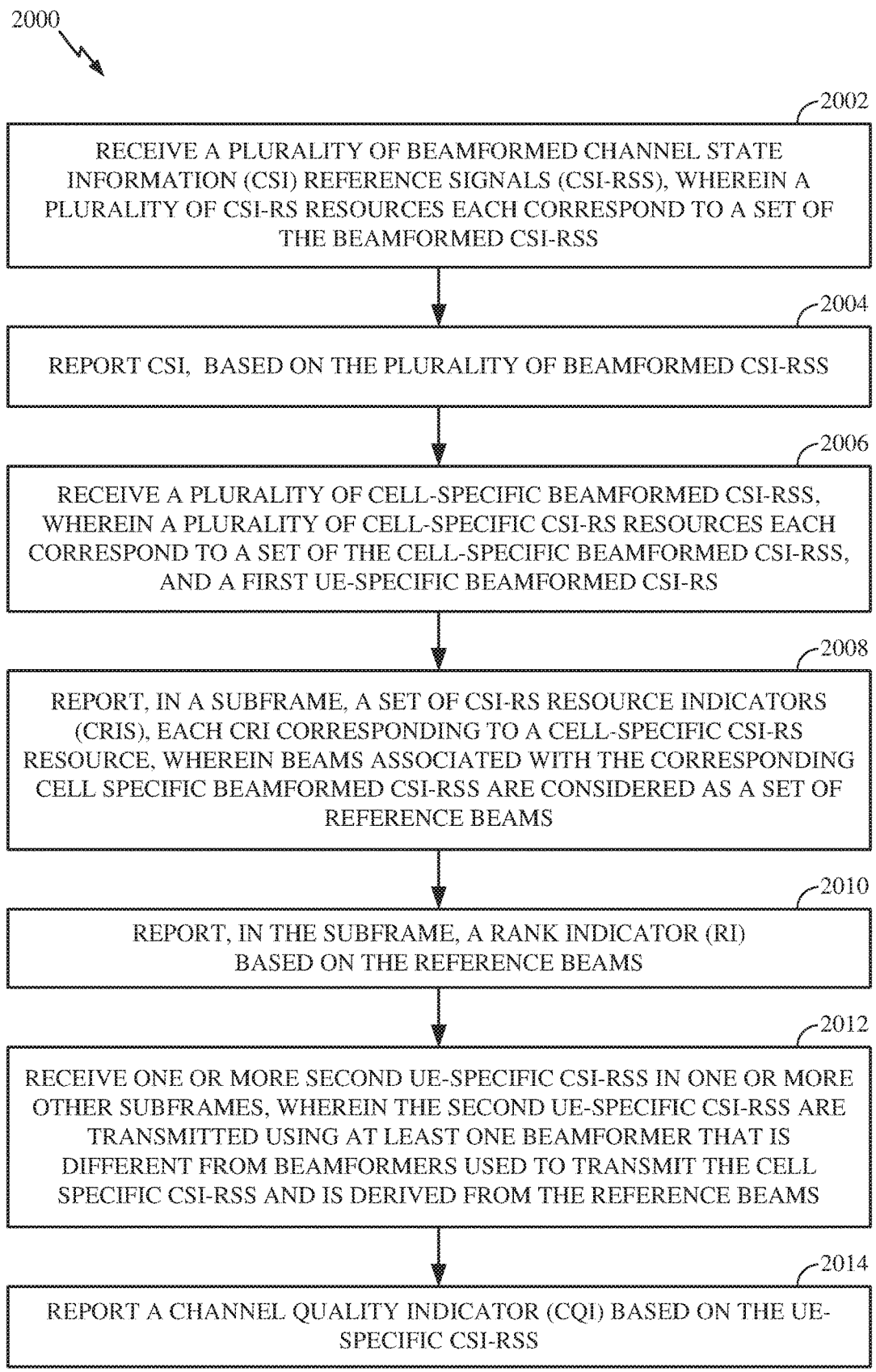
FIG. 20 shows example operations that may be performed by a UE, in accordance with aspects of the present disclosure.
Figure 20A:
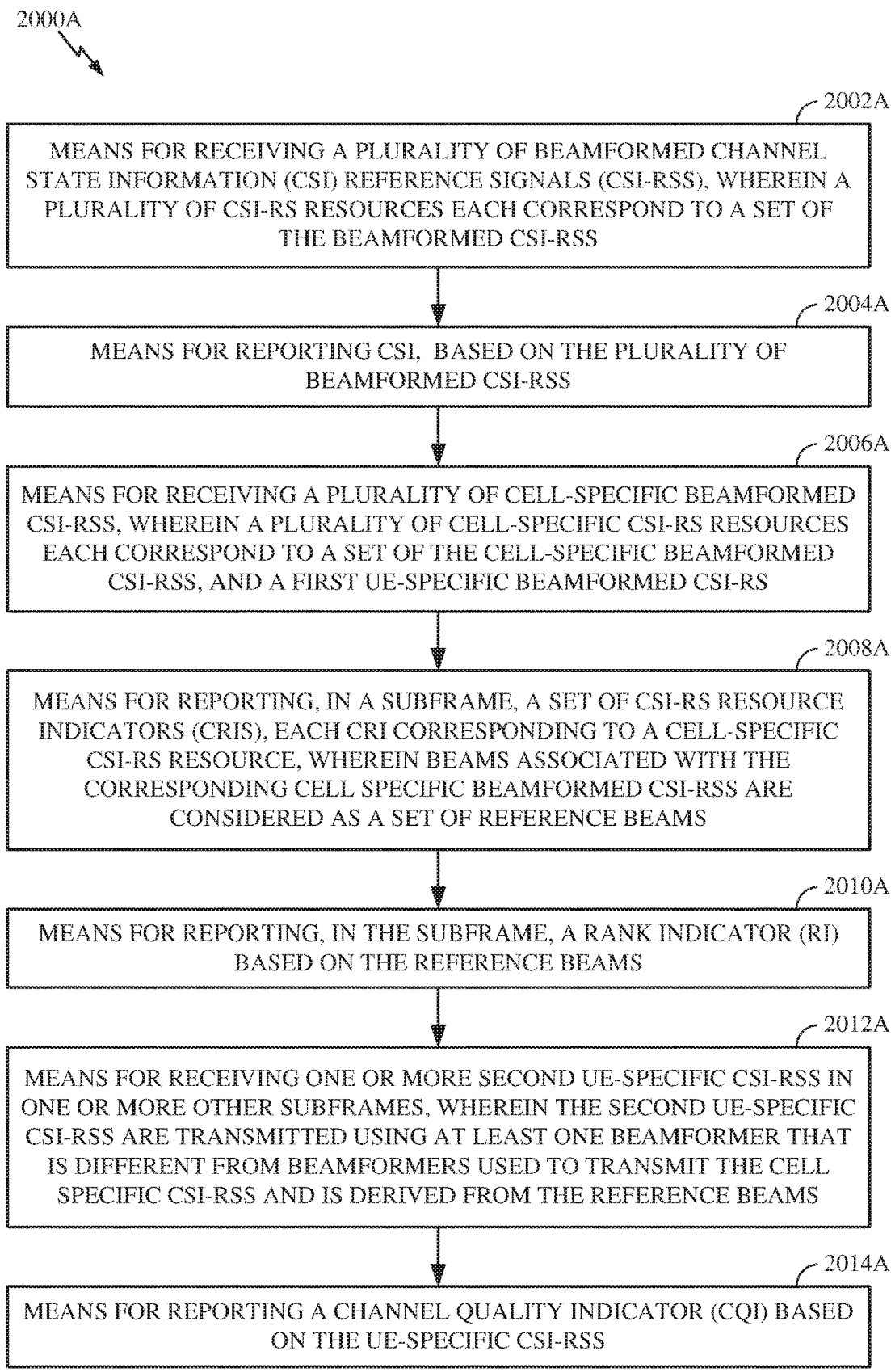
FIG. 20A illustrates example means capable of performing the operations shown in FIG. 20.

FIG. 20 illustrates exemplary operations 2000 for reporting CSI for beam switching, in accordance with aspects of the present disclosure. Operations 2000 may be performed by a UE, such as UE 120 shown in FIG. 1, for example.

Operations 2000 begin at block 2002 with the UE receiving a plurality of beamformed channel state information (CSI) reference signals (CSI-RSs), wherein a plurality of CSI-RS resources each correspond to a set of the beamformed CSI-RSs.

At block 2004, operations 2000 continue with the UE reporting CSI, based on the plurality of beamformed CSI-RSs.

Operations 2000 continue at block 2006 with the UE receiving a plurality of cell-specific beamformed CSI-RSs, wherein a plurality of cell-specific CSI-RS resources each correspond to a set of the cell-specific beamformed CSI-RSs, and a first UE-specific beamformed CSI-RS.

Operations 2000 continue at block 2006 with the UE reporting, in a subframe, a set of CSI-RS resource indicators (CRIs), each CRI corresponding to a cell-specific CSI-RS resource, wherein beams associated with the corresponding cell specific beamformed CSI-RS resources are considered as a set of reference beams.

At block 2008, operations 2000 continue with the UE reporting, in the subframe, a rank indicator (RI) based on the reference beams.

Operations 2000 continue at block 2010 with the UE receiving one or more second UE-specific CSI-RSs in one or more other subframes, wherein the second UE-specific CSI-RSs are transmitted using at least one beamformer that is different from beamformers used to transmit cell specific CSI-RSs and is derived from the reference beams.

At block 2012, operations 2000 conclude with the UE reporting a channel quality indicator (CQI) based on the first and second UE-specific CSI-RSs.

Figure 21:
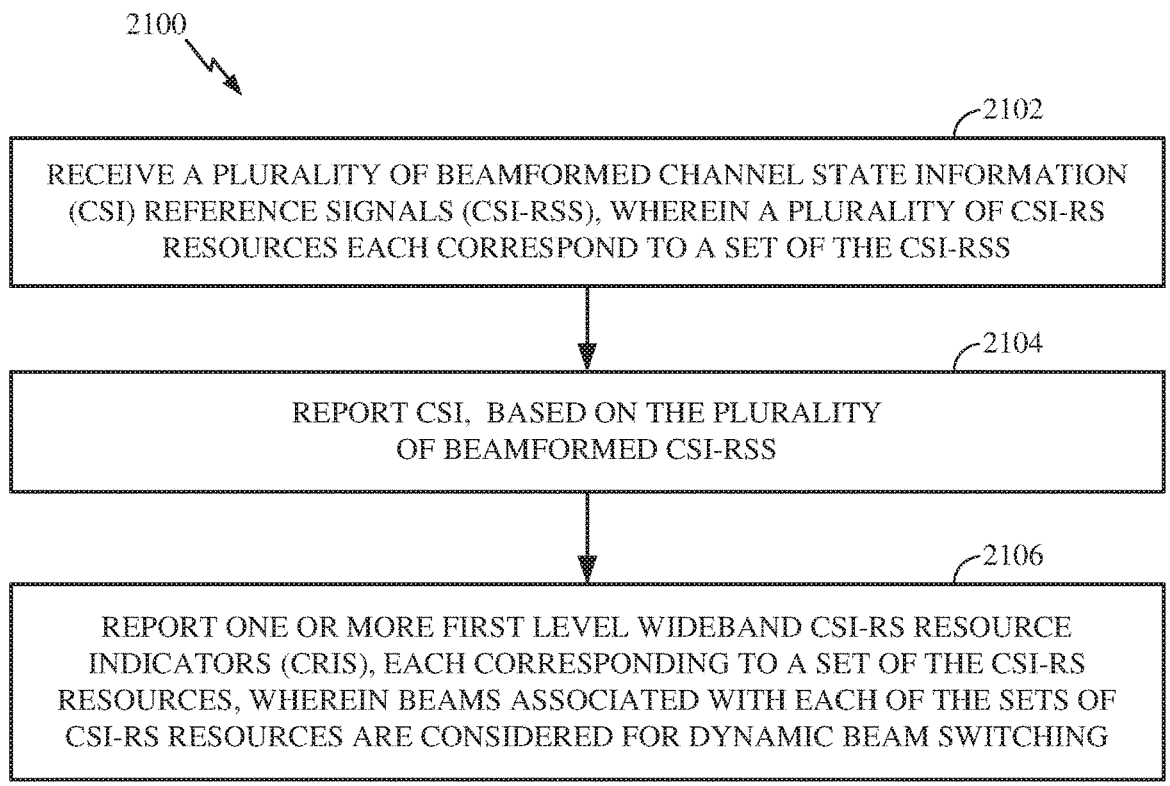
FIG. 21 shows example operations that may be performed by a UE, in accordance with aspects of the present disclosure.
Figure 21A:
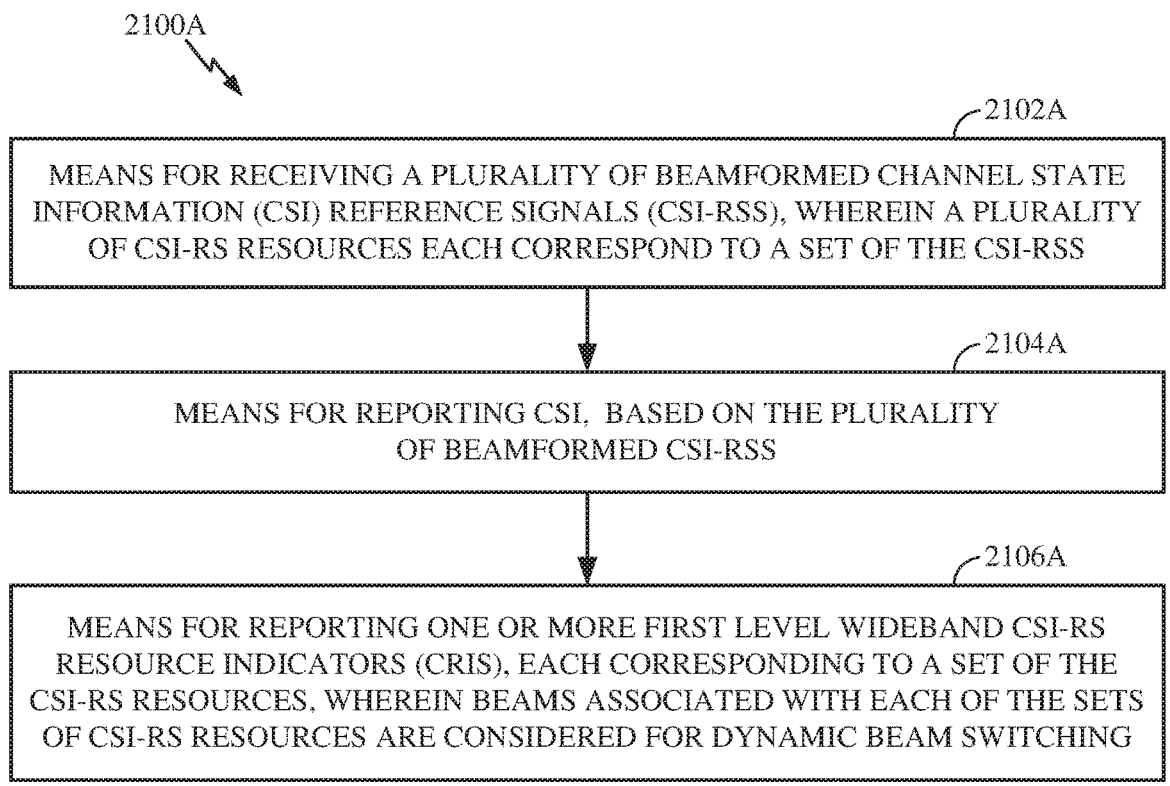
FIG. 21A illustrates example means capable of performing the operations shown in FIG. 21.

FIG. 21 illustrates exemplary operations 2100 for reporting CSI for beam switching, in accordance with aspects of the present disclosure. Operations 2100 may be performed by a UE, such as UE 120 shown in FIG. 1, for example.

Operations 2100 begin at block 2102 with the UE receiving a plurality of beamformed channel state information (CSI) reference signals (CSI-RSs), wherein a plurality of CSI-RS resources each correspond to a set of the CSI-RSs.

At block 2104, operations 2100 continue with the UE reporting CSI, based on the plurality of beamformed CSI-RSs.

Operations 2100 conclude at block 2106 with the UE reporting one or more first level wideband CSI-RS resource indicators (CRIs), each corresponding to a set of the CSI-RS resources, wherein beams associated with the set of resources are considered for dynamic beam switching.

According to aspects of the present disclosure, the plurality of CSI-RS resources may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

Figure 22:
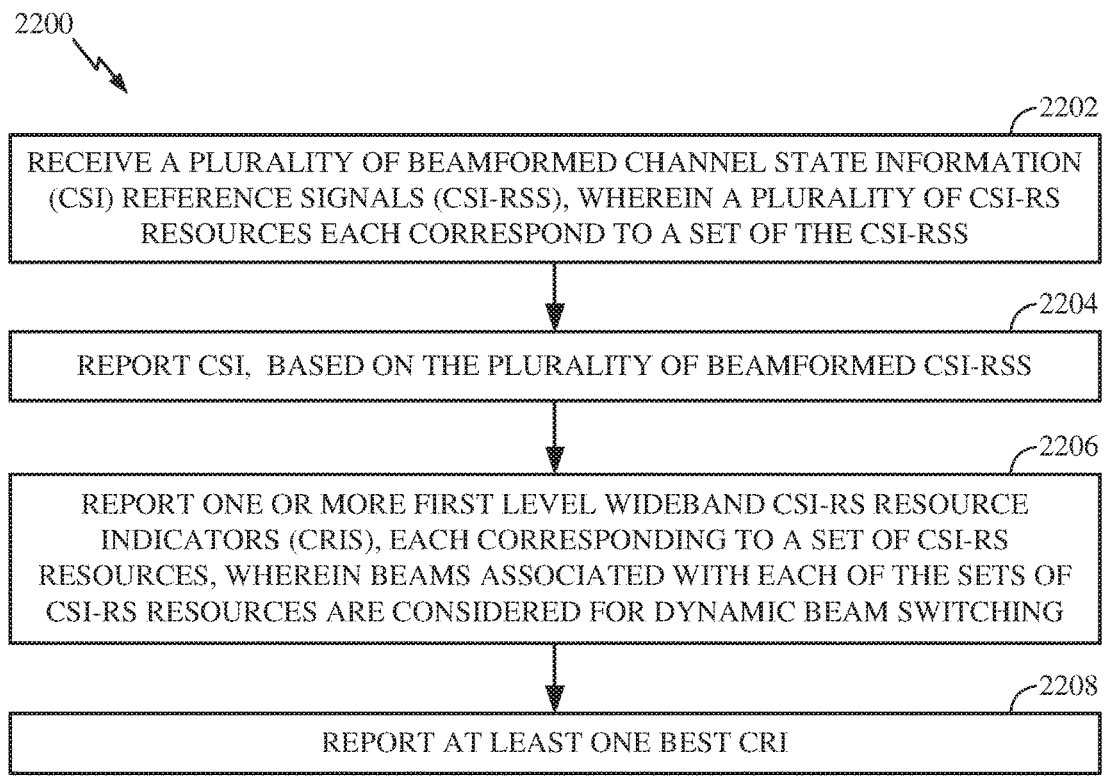
FIG. 22 shows example operations that may be performed by a UE, in accordance with aspects of the present disclosure.
Figure 22A:
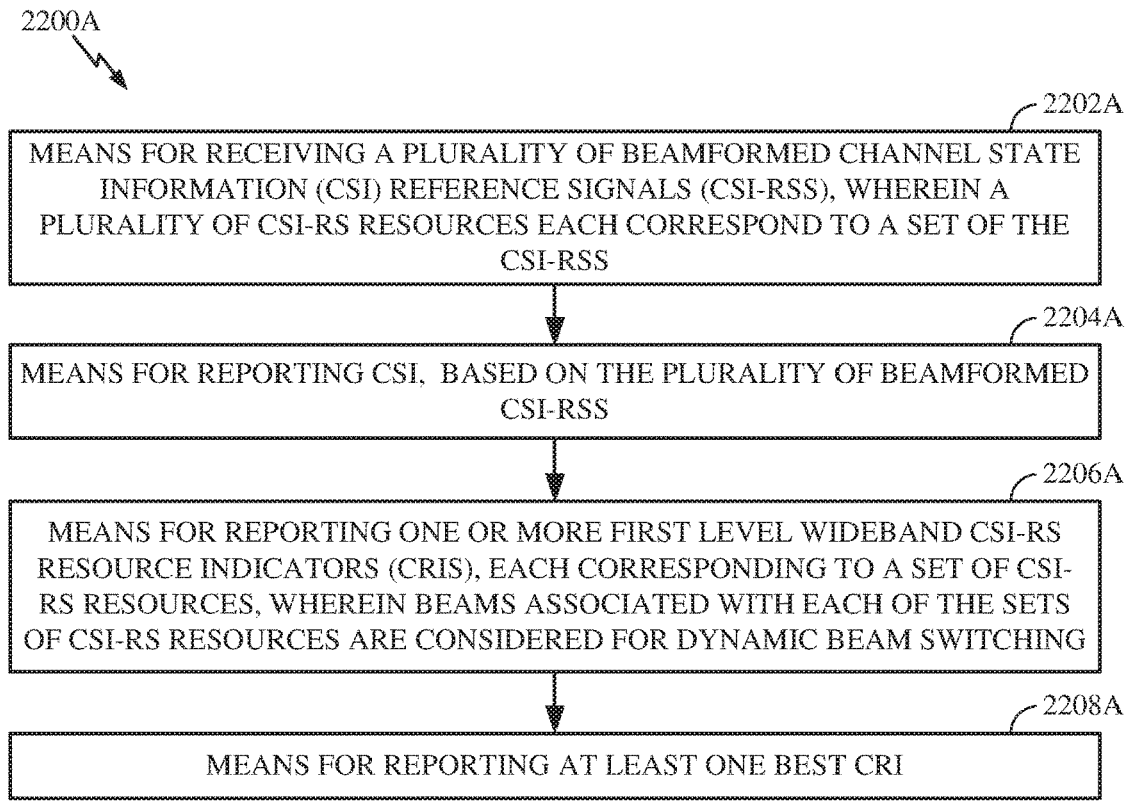
FIG. 22A illustrates example means capable of performing the operations shown in FIG. 22.

FIG. 22 illustrates exemplary operations 2200 for reporting CSI for beam switching, in accordance with aspects of the present disclosure. Operations 2200 may be performed by a UE, such as UE 120 shown in FIG. 1, for example.

Operations 2200 begin at block 2202 with the UE receiving a plurality of beamformed channel state information (CSI) reference signals (CSI-RSs), wherein a plurality of CSI-RS resources each correspond to a set of the CSI-RSs.

At block 2204, operations 2200 continue with the UE reporting CSI, based on the plurality of beamformed CSI-RSs.

Operations 2200 continue at block 2206 with the UE reporting one or more first level wideband CSI-RS resource indicators (CRIs), each corresponding to a set of CSI-RS resources, wherein beams associated with each of the sets of CSI-RS resources are considered for dynamic beam switching.

At block 2208, operations 2200 conclude with the UE reporting at least one best CRI.

As with other aspects of the present disclosure, the plurality of CSI-RS resources described with reference to FIG. 22 may not all be associated with a same transmit and receive point (TRP). That is, the plurality of CSI-RS resources may include CSI-RS resources associated with a plurality of TRPs, with one or more of the CSI-RS resources associated with each of the plurality of TRPs.

Figure 23:
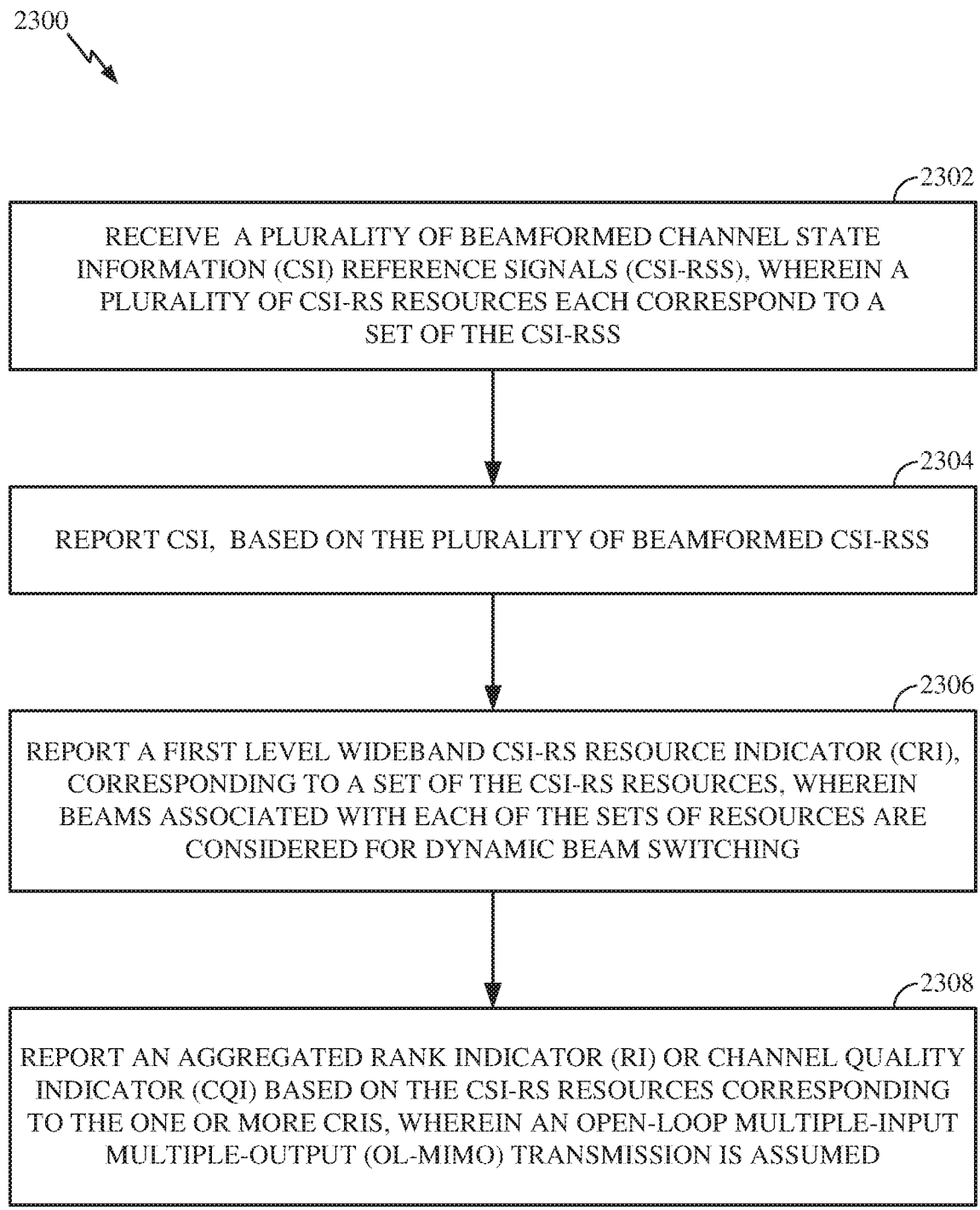
FIG. 23 shows example operations that may be performed by a UE, in accordance with aspects of the present disclosure.
Figure 23A:
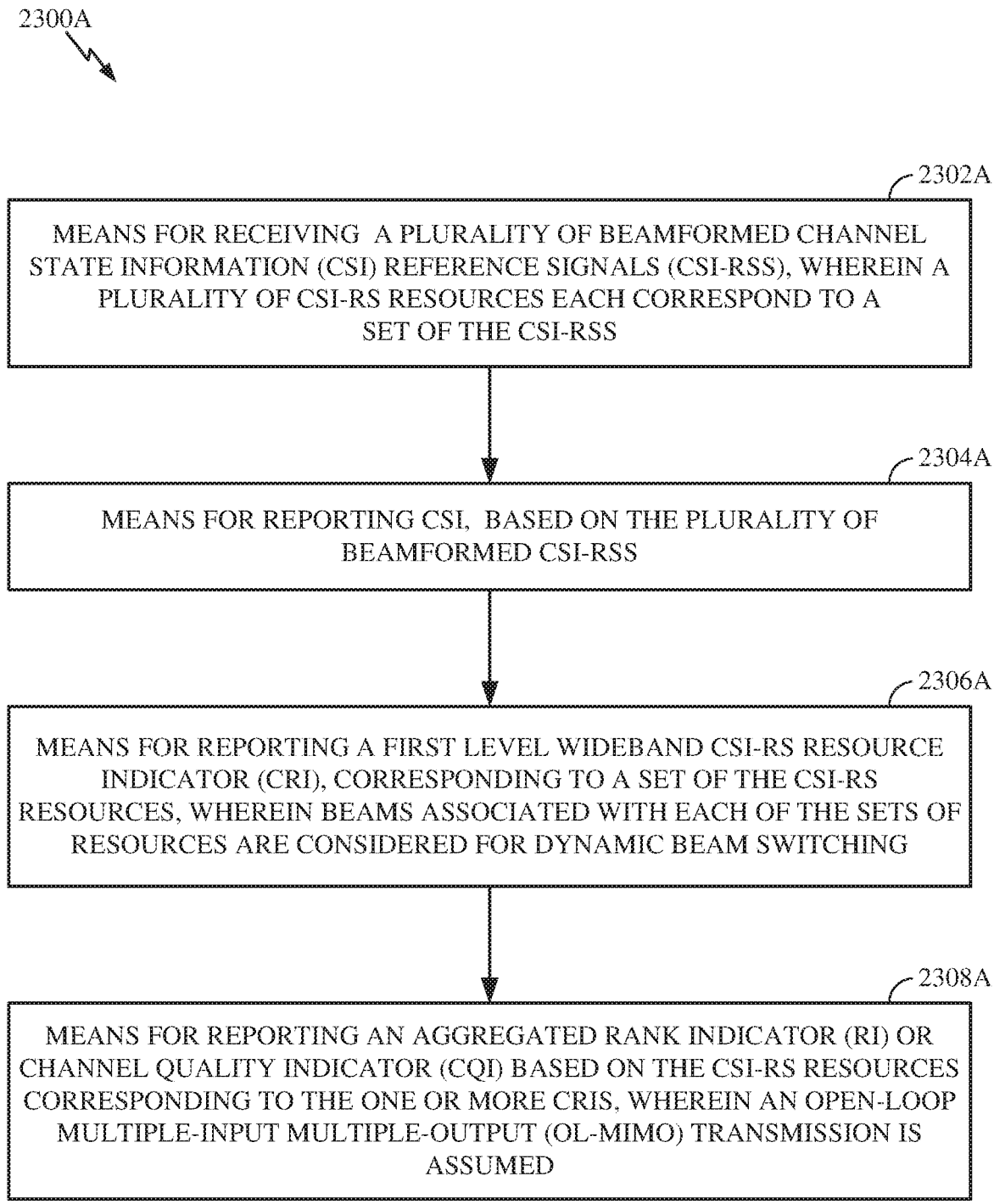
FIG. 23A illustrates example means capable of performing the operations shown in FIG. 23.

FIG. 23 illustrates exemplary operations 2300 for reporting CSI for beam switching, in accordance with aspects of the present disclosure. Operations 2300 may be performed by a UE, such as UE 120 shown in FIG. 1, for example.

Operations 2300 begin at block 2302 with the UE receiving a plurality of beamformed channel state information (CSI) reference signals (CSI-RSs), wherein a plurality of CSI-RS resources each correspond to a set of the CSI-RSs.

At block 2304, operations 2300 continue with the UE reporting CSI, based on the plurality of beamformed CSI-RS resources.

Operations 2300 continue at block 2306 with the UE reporting a first level wideband CSI-RS resource indicator (CRI), corresponding to a set of the CSI-RS resources, wherein beams associated with each of the sets of CSI-RS resources are considered for dynamic beam switching.

At block 2308, operations 2300 conclude with the UE reporting an aggregated rank indicator (RI) or channel quality indicator (CQI) based on the CSI-RS resources corresponding to the set of CRIs, wherein an open-loop multiple-input multiple-output (OL-MIMO) transmission is assumed.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1200, 1300, 1400, 1500, 1600, 1700, 1800, 1900, 2000, 2100, 2200, and 2300 illustrated in FIGS. 12, 13, 14, 15, 16, 17, 18, 19, 20, 21, 22, and 23, may correspond to means 1200A, 1300A. 1400A, 1500A, 1600A, 1700A. 1800A, 1900A, 2000A, 2100A, 2200A, and 2300A illustrated in FIGS. 12A, 13A, 14A, 15A, 16A. 17A, 18A, 19A, 20A, 21A, 22A, and 23A.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively. or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory). PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
receiving a plurality of channel state information reference signals (CSI-RSs), wherein a plurality of CSI-RS resources each correspond to a set of CSI-RSs of the plurality of CSI-RSs and a set of antenna ports used in transmitting the set of CSI-RSs;
assuming transmission of at least one first transmission on a plurality of time-frequency resource units, wherein:
the at least one first transmission comprises a plurality of layers,
the at least one first transmission uses a plurality of the antenna ports of the set of antenna ports associated with one of the plurality of CSI-RS resources, and
different precoders map the plurality of layers to the set of antenna ports for different time-frequency resource units in each assumed first transmission of the at least one first transmission;
based on the plurality of CSI-RSs, determining:
a precoding matrix indicator (PMI) for the assumed at least one first transmission, and
a first plurality of channel quality indicators (CQIs) for the assumed at least one first transmission; and
transmitting the PMI and the first plurality of CQIs for the assumed at least one first transmission.

2. The method of claim 1, wherein the plurality of CSI-RS resources are not all associated with a same transmit and receive point (TRP).

3. The method of claim 1, wherein:
assuming transmission of the at least one first transmission comprises assuming the at least one first transmission would be transmitted using a closed-loop multiple-input multiple-output (CL-MIMO) transmission scheme,
transmitting the first plurality of CQIs comprises transmitting the first plurality of CQIs on a periodic basis,
transmitting the PMI comprises transmitting the PMI on the periodic basis, and
the method further comprises:
assuming transmission of at least one a second transmission using an open-loop multiple-input multiple-output (OL-MIMO) transmission scheme;
determining a second plurality of CQIs for the assumed at least one second transmission; and
transmitting the second plurality of CQIs in response to obtaining an indication to report aperiodic channel state information (A-CSI).

4. The method of claim 1, wherein assuming transmission of the at least one first transmission comprises assuming the at least one first transmission would be transmitted using an open-loop multiple-input multiple-output (OL-MIMO) transmission scheme.

5. The method of claim 4, wherein transmitting the first plurality of CQIs comprises transmitting the first plurality of CQIs on a periodic basis, and the method further comprises:
assuming transmission of at least one second transmission using a closed-loop multiple-input multiple-output (CL-MIMO) transmission scheme;
determining a second plurality of CQIs for the assumed at least one second transmission;
determining a plurality of PMIs, wherein each PMI of the plurality of PMIs is based on a corresponding second transmission of the assumed at least one second transmission; and
transmitting the plurality of PMIs and the second plurality of CQIs in response to obtaining an indication to report aperiodic channel state information (A-CSI).

6. A method for wireless communications, comprising:
receiving a plurality of beamformed channel state information (CSI) reference signals (CSI-RSs), wherein a plurality of CSI-RS resources each correspond to a set of beamformed CSI-RSs of the plurality of beamformed CSI-RSs;
reporting CSI, based on the plurality of beamformed CSI-RSs;
reporting one or more first level wideband CSI-RS resource indicators (CRIs), each corresponding to a set of the CSI-RS resources of the plurality of CSI-RS resources, wherein beams associated with each of the sets of CSI-RS resources are considered for dynamic beam switching between both spatial layers and resource blocks; and
reporting an aggregated rank indicator (RI) or channel quality indicator (CQI) based on the CSI-RS resources corresponding to the one or more first level wideband CRIs.

7. The method of claim 6, further comprising:
reporting a CQI and a precoding matrix indicator (PMI) for each CSI-RS resource of the plurality of CSI-RS resources, wherein each of the CQIs and the PMIs are determined assuming a closed-loop multiple-input multiple-output (CL-MIMO) or an open-loop multiple-input multiple-output (OL-MIMO) transmission scheme and using antenna ports associated with the CSI-RS resource.

8. The method of claim 7, wherein not all of the CSI-RS resources of the plurality of CSI-RS resources are associated with a same transmit and receive point (TRP).

9. The method of claim 6, further comprising:
selecting, based on a plurality of channel quality metrics corresponding to the plurality of CSI-RS resources, one or more best CSI-RS resources of the plurality of CSI-RS resources; wherein:
reporting one or more first level wideband CRIs comprises reporting a set of CRIs, each CRI of the set of CRIs indicating one of the one or more best CSI-RS resources; and
an open-loop multiple-input multiple-output (MIMO) transmission is assumed using antenna ports associated with the CSI-RS resources corresponding to the set of CRIs.

10. The method of claim 9, wherein not all of the CSI-RS resources of the plurality of CSI-RS resources are associated with a same transmit and receive point (TRP).

11. The method of claim 9, further comprising:
receiving an indication of a number of the one or more best CSI-RS resources to select, wherein selecting, based on a plurality of channel quality metrics corresponding to the plurality of CSI-RS resources, the one or more best CSI-RS resources comprises selecting the indicated number of the one or more best CSI-RS resources.

12. The method according to claim 6, further comprising:
reporting one or more first level wideband CRIs comprises reporting a set of CRIs, each CRI of the set of CRIs corresponding to a CSI-RS resource in the plurality of CSI-RS resources, wherein beams associated with the corresponding CSI-RS resources are considered as a set of reference beams;
deriving a set of candidate beams for RI or CQI reporting based on the set of reference beams; and
reporting at least one aggregated RI or CQI based on the set of candidate beams, wherein an open-loop multiple-input multiple-output (OL-MIMO) transmission is assumed using antenna ports associated with the set of candidate beams.

13. The method according to claim 6, further comprising:
receiving a plurality of cell-specific beamformed CSI-RSs, wherein a plurality of cell-specific CSI-RS resources each correspond to a set of cell-specific beamformed CSI-RSs of the plurality of cell-specific beamformed CSI-RSs and a first UE-specific beamformed CSI-RS;
reporting, in a subframe, a set of CRIs, each CRI of the set of CRIs corresponding to a cell-specific CSI-RS resource of the plurality of cell-specific CSI-RS resources, wherein beams associated with the cell-specific beamformed CSI-RSs corresponding to the cell-specific CSI-RS resources are considered as a set of reference beams;
reporting, in the subframe, an RI based on the set of reference beams;
receiving one or more second UE-specific CSI-RSs in one or more other subframes, wherein the one or more second UE-specific CSI-RSs are transmitted using at least one beamformer that is different from beamformers used to transmit the plurality of cell-specific beamformed CSI-RSs and is derived from the set of reference beams; and
reporting a CQI based on the first and the second UE-specific CSI-RSs.

14. The method of claim 6, wherein not all of the CSI-RS resources of the plurality of CSI-RS resources are associated with a same transmit and receive point (TRP).

15. The method according to claim 6, further comprising:
reporting at least one best CRI of the one or more first level wideband CRIs.

16. An apparatus for wireless communications, comprising:
means for receiving a plurality of channel state information reference signals (CSI-RSs),
wherein a plurality of CSI-RS resources each correspond to a set of CSI-RSs of the plurality of CSI-RSs and a set of antenna ports used in transmitting the set of CSI-RSs;
means for assuming transmission of at least one first transmission on a plurality of time-frequency resource units, wherein:
the at least one first transmission comprises a plurality of layers,
the at least one first transmission uses a plurality of the antenna ports of the set of antenna ports associated with one of the plurality of CSI-RS resources, and
different precoders map the plurality of layers to the set of antenna ports for different time-frequency resource units in each assumed first transmission of the at least one first transmission;
means for determining, based on the plurality of CSI-RSs:
a precoding matrix indicator (PMI) for the assumed at least one first transmission, and
a first plurality of channel quality indicators (CQIs) for the assumed at least one first transmission; and
means for transmitting the PMI and the first plurality of CQIs for the assumed at least one first transmission.

17. The apparatus of claim 16, wherein the means for receiving the plurality of CSI-RSs comprises means for receiving CSI-RSs that are not all transmitted by a same transmit and receive point (TRP).

18. The apparatus of claim 16, wherein:
the means for assuming transmission of the at least one first transmission comprises means for assuming the at least one first transmission would be transmitted using a closed-loop multiple-input multiple-output (CL-MIMO) transmission scheme,
the means for transmitting the first plurality of CQIs comprises transmitting the first plurality of CQIs on a periodic basis, and
the means for transmitting the PMI comprises transmitting the PMI on the periodic basis, and
the apparatus further comprises:
means for assuming transmission of at least one a second transmission using an open-loop multiple-input multiple-output (OL-MIMO) transmission scheme;
means for determining a second plurality of CQIs for the assumed at least one second transmission; and
means for transmitting the second plurality of CQIs in response to obtaining an indication to report aperiodic channel state information (A-CSI).

19. The apparatus of claim 16, wherein the means for assuming transmission of the at least one first transmission comprises means for assuming the at least one first transmission would be transmitted using an open-loop multiple-input multiple-output (OL-MIMO) transmission scheme.

20. The apparatus of claim 19, wherein the means for transmitting the first plurality of CQIs comprises means the first plurality of CQIs on a periodic basis, and the apparatus further comprises:
  means for assuming transmission of at least one second transmission using a closed-loop multiple-input multiple-output (CL-MIMO) transmission scheme;
  means for determining a second plurality of CQIs for the assumed at least one second transmission;
  means for determining a plurality of PMIs, wherein each PMI of the plurality of PMIs is based on a corresponding second transmission of the assumed at least one second transmission; and
  means for transmitting the plurality of PMIs and the second plurality of CQIs in response to obtaining an indication to report aperiodic channel state information (A-CSI).

21. An apparatus for wireless communications, comprising:
  means for receiving a plurality of beamformed channel state information (CSI) reference signals (CSI-RSs), wherein a plurality of CSI-RS resources each correspond to a set of beamformed CSI-RSs of the plurality of beamformed CSI-RSs;
  means for reporting CSI, based on the plurality of beamformed CSI-RSs;
  means for reporting one or more first level wideband CSI-RS resource indicators (CRIs), each corresponding to a set of the CSI-RS resources of the plurality of CSI-RS resources, wherein beams associated with each of the sets of CSI-RS resources are considered for dynamic beam switching between both spatial layers and resource blocks; and
  means for reporting an aggregated rank indicator (RI) or channel quality indicator (CQI) based on the CSI-RS resources corresponding to the one or more first level wideband CRIs.

22. The apparatus of claim 21, further comprising:
  means for reporting CQI and a precoding matrix indicator (PMI) for each CSI-RS resource of the plurality of CSI-RS resources, wherein each of the CQIs and the PMIs are determined assuming a closed-loop multiple-input multiple-output (CL-MIMO) or an open-loop multiple-input multiple-output (OL-MIMO) transmission scheme and using antenna ports associated with the CSI-RS resource.

23. The apparatus of claim 22, wherein not all of the CSI-RS resources of the plurality of CSI-RS resources are associated with a same transmit and receive point (TRP).

24. The apparatus of claim 21, further comprising:
  means for selecting, based on a plurality of channel quality metrics corresponding to the plurality of CSI-RS resources, one or more best CSI-RS resources of the one or more CSI-RS resources, wherein:
    means for reporting one or more first level wideband CRIs comprises means for reporting a set of CRIs, each CRI of the set of CRIs indicating one of the one or more best CSI-RS resources; and
    an open-loop multiple-input multiple-output (MIMO) transmission is assumed using antenna ports associated with the CSI-RS resources corresponding to the set of CRIs.

25. The apparatus of claim 21, wherein the means for receiving the plurality of CSI-RSs comprises means for receiving CSI-RSs that are not all transmitted by a same transmit and receive point (TRP).

26. The apparatus of claim 21, further comprising:
  means for receiving an indication of a number of the one or more best CSI-RS resources to select, wherein selecting, based on a plurality of channel quality metrics corresponding to the plurality of CSI-RS resources, the one or more best CSI-RS resources comprises selecting the indicated number of the one or more best CSI-RS resources.

27. The method of claim 1, further comprising, based on the plurality of CSI-RSs, determining:
  a CSI-RS resource indicator (CRI) indicating a CSI-RS resource of the plurality CSI-RS resources for the assumed first transmission, and
  a rank indicator (RI) indicating a number of layers of the plurality of layers for the assumed first transmission.

* * * * *